United States Patent
Shimotsuma et al.

(10) Patent No.: US 11,172,167 B2
(45) Date of Patent: Nov. 9, 2021

(54) VIDEO TRANSMITTING DEVICE, VIDEO TRANSMITTING METHOD, AND RECORDING MEDIUM

(71) Applicant: Panasonic Intellectual Property Corporation of America, Torrance, CA (US)

(72) Inventors: Yuta Shimotsuma, Osaka (JP); Takahiro Yoneda, Osaka (JP); Yasunori Ishii, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/560,313

(22) Filed: Sep. 4, 2019

(65) Prior Publication Data
US 2020/0084419 A1 Mar. 12, 2020

(30) Foreign Application Priority Data

Sep. 10, 2018 (JP) ............................. JP2018-168948
Apr. 26, 2019 (JP) ............................. JP2019-084992

(51) Int. Cl.
*H04N 7/18* (2006.01)
*H04N 5/262* (2006.01)

(52) U.S. Cl.
CPC ........... *H04N 7/183* (2013.01); *H04N 5/2628* (2013.01)

(58) Field of Classification Search
None
See application file for complete search history.

(56) References Cited

U.S. PATENT DOCUMENTS

| | | | | |
|---|---|---|---|---|
| 9,321,470 | B1 * | 4/2016 | Riden | B61L 23/34 |
| 9,767,369 | B2 * | 9/2017 | Furman | G06K 9/00805 |
| 10,338,591 | B2 * | 7/2019 | Baalke | G05D 1/0244 |
| 2017/0347002 | A1 * | 11/2017 | Baker | G06K 9/00832 |
| 2018/0356814 | A1 * | 12/2018 | Brooks | B61L 27/0022 |
| 2018/0362031 | A1 * | 12/2018 | Chang | B60W 30/18163 |
| 2019/0163176 | A1 * | 5/2019 | Wang | G05D 1/0061 |
| 2019/0294159 | A1 * | 9/2019 | Pedersen | G05D 1/0038 |

FOREIGN PATENT DOCUMENTS

| | | |
|---|---|---|
| JP | 5366703 | 12/2013 |
| JP | 2016-72686 | 5/2016 |
| JP | 2018-106676 | 7/2018 |

OTHER PUBLICATIONS

Extended European Search Report dated Dec. 12, 2019 in corresponding European Patent Application No. 19194348.9.

* cited by examiner

*Primary Examiner* — Chikaodili E Anyikire
(74) *Attorney, Agent, or Firm* — Wenderoth, Lind & Ponack, L.L.P.

(57) ABSTRACT

A video transmitting device is to be provided in a vehicle and includes a first acquiring unit that acquires first video information from an imaging unit that captures images of the surroundings of the vehicle, a risk map creating unit that creates a risk map indicating a risk region in traveling of the vehicle, a video creating unit that creates second video information having a data amount smaller than a data amount of the first video information on the basis of the risk map, and a communication unit that transmits the second video information to a remote monitoring device for remotely monitoring the vehicle.

19 Claims, 16 Drawing Sheets

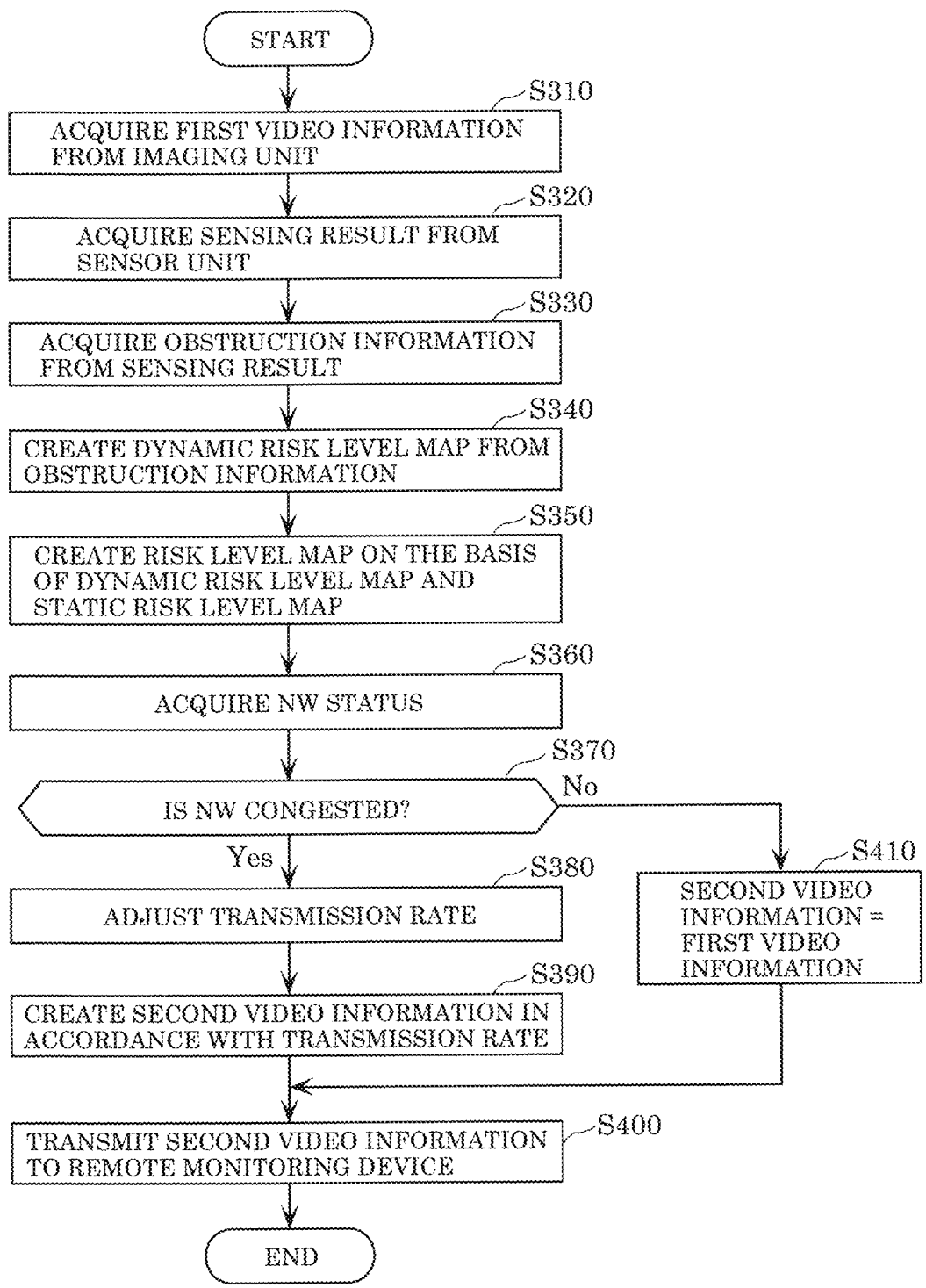

VIDEO TRANSMITTING DEVICE, VIDEO TRANSMITTING METHOD, AND RECORDING MEDIUM

CROSS REFERENCE TO RELATED APPLICATION

This application claims the benefit of priority of Japanese Patent Application Number 2018-168948 filed on Sep. 10, 2018, and 2019-084992 filed on Apr. 26, 2019, the entire contents of which are hereby incorporated by reference.

BACKGROUND

1. Technical Field

The present disclosure relates to video transmitting devices to be provided in vehicles, video transmitting methods, and recording medium.

2. Description of the Related Art

In one existing vehicle controlling system, a remotely located operator indirectly drives and/or operates a driverless vehicle or a vehicle that is not operated by a driver through wireless communication via a wireless local area network (LAN), a mobile phone circuit, or the like.

In such a vehicle controlling system, via a communication network, a vehicle transmits, to the operator, sensing results obtained with in-vehicle sensors (e.g., millimeter-wave radar, laser radar, and camera) observing the vehicle's surroundings, and the operator transmits control information concerning traveling of the vehicle. Thus, the operator remotely operates the vehicle.

Japanese Patent No. 5366703 discloses a remote operation system (vehicle controlling system) for a semi-autonomous driverless vehicle (operated vehicle). The remote operation system disclosed in Japanese Patent No. 5366703 includes a semi-autonomous vehicle. This semi-autonomous vehicle acquires range data within its traveling area and autonomously travels on the basis of the range data. The semi-autonomous vehicle is also remotely operated by a remotely located operator in accordance with operation information (control information) transmitted from a remote operation device. The remote operation system includes a display, and an image captured by a camera in the vehicle is displayed on this display. The operator can remotely operate the semi-autonomous vehicle by checking the image displayed on the display.

SUMMARY

According to Japanese Patent No. 5366703, although the operator can check images captured by the camera in the vehicle, the technique fails to take into consideration any waste of network band between the vehicle and the remote monitoring system. Therefore, the network band may be wasted to result in its shortage.

Accordingly, the present disclosure is directed to providing a video transmitting device, a video transmitting method, and a recording medium capable of reducing wasted network band.

A video transmitting device according to one aspect of the present disclosure is to be provided in a vehicle, and the video transmitting device comprises a first acquiring unit that acquires first video information from an imaging unit that captures images of surroundings of the vehicle; a risk map creating unit that creates a risk map indicating a risk region in the surroundings of the vehicle; a video creating unit that creates second video information having a data amount smaller than a data amount of the first video information on a basis of the risk map; and a communication unit that transmits the second video information to a remote monitoring device for remotely monitoring the vehicle.

A video transmitting device according to one aspect of the present disclosure is to be provided in a vehicle, and the video transmitting device comprises a first acquiring unit that acquires first video information from an imaging unit that captures images of surroundings of the vehicle; a second acquiring unit that acquires a sensing result from a sensor unit that performs sensing of the surroundings of the vehicle; an object detecting unit that creates obstruction information indicating a position and a speed of an obstruction on a basis of the sensing result and the first video information; a risk map creating unit that creates a risk map indicating a risk region in the surroundings of the vehicle; a video creating unit that creates second video information on a basis of the risk map; a communication unit that transmits monitoring information to be transmitted to a remote monitoring device for remotely monitoring the vehicle; and a determining unit that determines whether a communication network between the vehicle and the remote monitoring device is congested, wherein the communication unit transmits the monitoring information including at least one of the sensing result, the obstruction information, and the second video information selected on a basis of a determination result of the determining unit.

A video transmitting method according to one aspect of the present disclosure is for a video transmitting device to be provided in a vehicle, and the video transmitting method comprises acquiring first video information from an imaging unit that captures images of surroundings of the vehicle; creating a risk map indicating a risk region in the surroundings of the vehicle; creating second video information having a reduced data amount from the first video information on a basis of the risk map; and transmitting the second video information to a remote monitoring device for remotely monitoring the vehicle.

A recording medium according to one aspect of the present disclosure is a non-transitory computer-readable recording medium for use in a computer, the recording medium having a computer program recorded thereon for causing the computer to execute the above video transmitting method.

These general or specific aspects may be implemented in the form of a system, a method, an integrated circuit, a computer program, or a non-transitory computer-readable recording medium, such as a CD-ROM, or through any desired combination of a system, a method, an integrated circuit, a computer program, and a recording medium. The program may be prestored in a recording medium or supplied to a recording medium via a broadband communication network including the internet.

The video transmitting device, the video transmitting method, and the recording medium according to some aspects of the present disclosure can reduce wasted network band.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 13 is a flowchart illustrating an operation of a video transmitting device according to Embodiment 2;

DETAILED DESCRIPTION OF THE EMBODIMENTS

Figure 1:
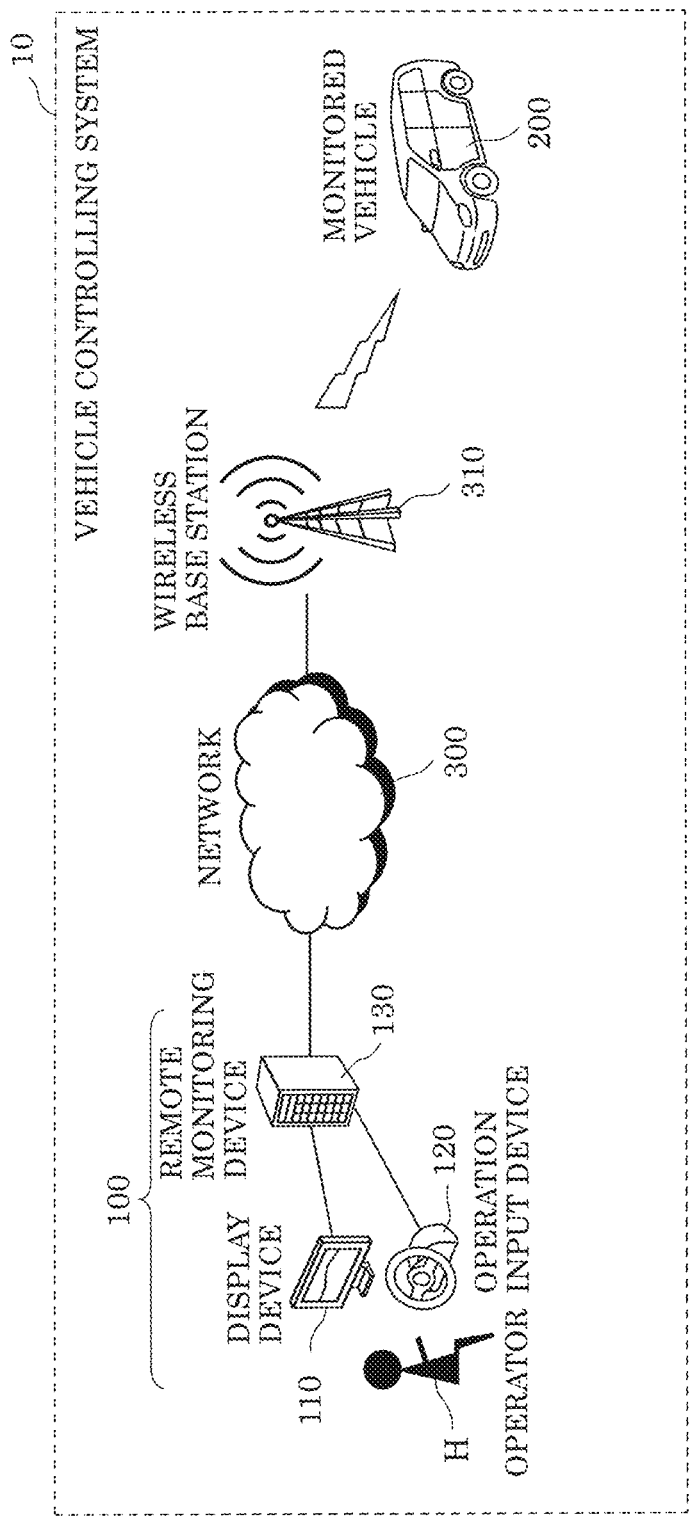
FIG. 1 illustrates a schematic configuration of a vehicle controlling system according to Embodiment 1.

A video transmitting device according to one aspect of the present disclosure is to be provided in a vehicle, and the video transmitting device includes a first acquiring unit that acquires first video information from an imaging unit that captures images of surroundings of the vehicle, a risk map creating unit that creates a risk map indicating a risk region in the surroundings of the vehicle, a video creating unit that creates second video information having a data amount smaller than a data amount of the first video information on the basis of the risk map, and a communication unit that transmits the second video information to a remote monitoring device for remotely monitoring the vehicle.

This configuration allows the video transmitting device to reduce the data amount of the second video information to be transmitted to the remote monitoring device in accordance with the risk region in the surroundings of the vehicle. Accordingly, the video transmitting device can reduce wasted network band between the vehicle and the remote monitoring device.

For example, the video creating unit creates the second video information by at least one of degrading, in the first video information, an image quality of a video of a first region corresponding to a region other than the risk region indicated in the risk map to an image quality lower than an image quality of a video of a second region corresponding to the risk region and cutting out the video of the second region from the first video information.

This configuration allows the operator to view a clear video of the region corresponding to the risk region. Accordingly, the video transmitting device can effectively inform the operator of any risk in traveling while reducing wasted network band.

For example, the video transmitting device further includes a determining unit that determines whether a communication network between the vehicle and the remote monitoring device is congested, and the communication unit transmits the second video information to the remote monitoring device if the determining unit has determined that the communication network is congested or transmits the first video information to the remote monitoring device if the determining unit has determined that the communication network is not congested.

This configuration causes the video transmitting device to transmit the second video information having a data amount smaller that the data amount of the first video information if the communication network is congested. In other words, the operator can promptly view the video that is based on the second video information even when the communication network is congested. Accordingly, the video transmitting device can, while reducing wasted network band, inform the operator of any risk in traveling in a shorter period of time as compared to the case in which the first video information is transmitted.

For example, the communication unit transmits the second video information at a transmission rate lower if the determining unit has determined that the communication network is congested than if the determining unit has determined that the communication network is not congested, and the video creating unit creates the second video information from the first video information in accordance with the transmission rate if the determining unit has determined that the communication network is congested.

This configuration causes the video transmitting device to transmit the second video information created in accordance with the transmission rate to the remote monitoring device. For example, if the transmission rate is set to a low value, further reducing the data amount of the second video information can reduce the time it takes to transmit the second video information. Accordingly, the video transmitting device can, while reducing wasted network band, inform the operator of any risk in traveling in an even shorter period of time as compared to the case in which the first video information is transmitted.

For example, the remote monitoring device is coupled to an operation input device that receives an operation input for a remote operation of the vehicle, and the video creating unit creates the second video information with additional use of a traveling route in the remote operation if the vehicle has received the remote operation through the operation input device.

This configuration allows the second video information suitable for the traveling route to be created, since the second video information is created in accordance with the traveling route in the remote operation. As the operator views the video that is based on the second video information corresponding to the traveling route, the operator can make a determination from a clearer video as to whether any risk will arise in traveling through the remote operation.

For example, the video creating unit creates the second video information with additional use of a target traveling route that the vehicle would travel when the vehicle is traveling through self-driving.

This configuration allows the second video information suitable for the traveling route to be created, since the second video information is created in accordance with the traveling route in self-driving. As the operator views the video that is based on the second video information corresponding to the traveling route, the operator can make a determination from a clearer video as to whether any risk will arise in traveling through self-driving.

For example, the video creating unit creates the second video information by at least one of degrading, in the first video information, an image quality of a video of a third region capturing a direction that is not a traveling direction in the traveling route to an image quality lower than an image quality of a video of a fourth region capturing the traveling direction and cutting out the video of the fourth region from the first video information.

This configuration allows the video transmitting device to transmit, to the remote monitoring device, the video of the region corresponding to the risk region and the video capturing the traveling direction with a higher image quality. In other words, the operator can view the traveling direction in the traveling route through a clearer video. Accordingly, the video transmitting device can effectively inform the operator of any risk in traveling through remote operation or self-driving while reducing wasted network band.

For example, the video transmitting device further includes a second acquiring unit that acquires a sensing result from a sensor unit that performs sensing of the surroundings of the vehicle, and an object detecting unit that creates obstruction information indicating a position and a speed of an obstruction on the basis of the sensing result and the first video information. The risk map creating unit creates the risk map on the basis of the obstruction information.

This configuration allows the video transmitting device to create the risk map with use of information acquired from the imaging unit and the sensor unit included in the vehicle.

For example, the risk map creating unit creates the risk map indicating a risk level of the surroundings of the vehicle on the basis of at least one of the first video information and the obstruction information.

This configuration allows the risk map creating unit to set the risk region as desired. The risk map creating unit can set, as a risk region, a region having a risk level of no lower than a predetermined value, for example. Thus, the risk region can be set with higher accuracy.

For example, if the determining unit has determined that the communication network is congested, the determining unit further determines whether a congestion level of the communication network is no higher than a threshold. The communication unit transmits the second video information if the determining unit has determined that the congestion level is no higher than the threshold or transmits at least one of the sensing result and the obstruction information if the determining unit has determined that the congestion level is higher than the threshold.

This configuration makes it possible to switch information to be transmitted in accordance with the congestion level of the communication network. Accordingly, the video transmitting device can transmit information of the surroundings of the vehicle at a more appropriate transmission rate in accordance with the congestion level of the communication network.

For example, the risk map creating unit creates the risk map from traffic information of the surroundings of the vehicle.

This configuration allows the risk map to be created with use of the traffic information (e.g., traffic accident information) acquired from the outside of the vehicle.

For example, the video creating unit creates the second video information by uniformly degrading the image quality of the first video indicated by the first video information if the risk region is not present in the risk map.

This configuration further reduces the data amount of the second video information when no risk region is present. Accordingly, the video transmitting device can further reduce wasted network band.

For example, the video creating unit refrains from creating the second video information if the risk region is not present in the risk map.

This configuration keeps the network band from being used when no risk region is present. Accordingly, the video transmitting device can further reduce wasted network band.

A video transmitting device according to one aspect of the present disclosure is to be provided in a vehicle, and the video transmitting device includes a first acquiring unit that acquires first video information from an imaging unit that captures images of surroundings of the vehicle, a second acquiring unit that acquires a sensing result from a sensor unit that performs sensing of the surroundings of the vehicle, an object detecting unit that creates obstruction information indicating a position and a speed of an obstruction on the basis of the sensing result and the first video information, a risk map creating unit that creates a risk map indicating a risk region in the surroundings of the vehicle, a video creating unit that creates second video information on the basis of the risk map, a communication unit that transmits monitoring information to be transmitted to a remote monitoring device for remotely monitoring the vehicle, and a determining unit that determines whether a communication network between the vehicle and the remote monitoring device is congested. The communication unit transmits the monitoring information including at least one of the sensing result, the obstruction information, and the second video information selected on the basis of a determination result of the determining unit.

This configuration allows information that is based on the determination result to be transmitted to the remote monitoring device. For example, if the communication network is congested, information having a smaller data amount (e.g., sensing result, obstruction information, or the like) is selected as the monitoring information. Thus, information of the surroundings of the vehicle can be transmitted at an even lower transmission rate.

For example, the communication unit transmits at least one of the sensing result and the obstruction information to the remote monitoring device if the determining unit has determined that the communication network is congested or transmits the second video information to the remote monitoring device if the determining unit has determined that the communication network is not congested.

This configuration allows the information of the surroundings of the vehicle to be transmitted at an even lower transmission rate, as the information to be transmitted when the communication network is congested is limited to at least one of the sensing information and the obstruction information.

A video transmitting method according to one aspect of the present disclosure is for a video transmitting device to be provided in a vehicle, and the video transmitting method includes acquiring first video information from an imaging unit that captures images of surroundings of the vehicle, creating a risk map indicating a risk region in the surroundings of the vehicle, creating second video information having a reduced data amount from the first video information on the basis of the risk map, and transmitting the second video information to a remote monitoring device for remotely monitoring the vehicle. A recording medium according to one aspect of the present disclosure causes a non-transitory computer-readable recording medium for use in a computer, the recording medium having a computer program recorded thereon for causing the computer to execute the above video transmitting method.

These aspects provide an advantageous effect similar to that of the video transmitting device.

Hereinafter, embodiments will be described in concrete terms with reference to the drawings.

The embodiments described below merely illustrate general or specific examples. The numerical values, the shapes, the materials, the constituent elements, the arrangement positions and the connection modes of the constituent elements, the steps, the orders of the steps, and so on illustrated in the following embodiments are examples and are not intended to limit the present disclosure. Among the constituent elements in the following embodiments, any constituent element that is not described in independent claims expressing the broadest concept is to be regarded as an optional constituent element.

The drawings are schematic diagrams and do not necessarily provide the exact depictions. In the drawings, configurations that are substantially identical are given identical reference characters, and duplicate descriptions thereof may be omitted or simplified.

In the present specification, expressions, such as "being equal," expressing relationships between elements, numerical values, and numerical ranges are not to express solely their strict meanings but to include their substantially equivalent ranges with, for example, differences of several percent.

Embodiment 1

A video transmitting device and so on according to the present embodiment will be described below with reference to FIGS. 1 to 9B.

[1-1. Configuration of Vehicle Controlling System]

A configuration of a vehicle controlling system including a monitored vehicle provided with a video transmitting device according to the present embodiment will be described first with reference to FIGS. 1 to 3. FIG. 1 illustrates a schematic configuration of vehicle controlling system 10 according to the present embodiment.

As illustrated in FIG. 1, vehicle controlling system 10 communicably connects monitored vehicle 200 and remote monitoring system 100 (specifically, remote monitoring device 130) via network 300 and wireless base station 310 for a wireless LAN, a communication terminal, or the like. Wireless base station 310 and network 300 are examples of a communication network. Monitored vehicle 200 is an example of a vehicle that operator H at least remotely monitors. Monitored vehicle 200 may be a vehicle that operator H remotely monitors and remotely operates.

In the present specification, the vehicle is, for example, a self-driving vehicle that controls its driving without the need for the driver's operation. Alternatively, the vehicle may be a vehicle that can travel selectively through self-driving or human-operated driving. The vehicle includes not only those typically called vehicles, such as an automobile, a train, or a bus, but also ships, such as a ferry, and aircrafts, such as an airplane.

Remote monitoring system 100 will be further described in detail with reference to FIG. 2. FIG. 2 illustrates a functional configuration of remote monitoring system 100 according to the present embodiment.

Figure 2:
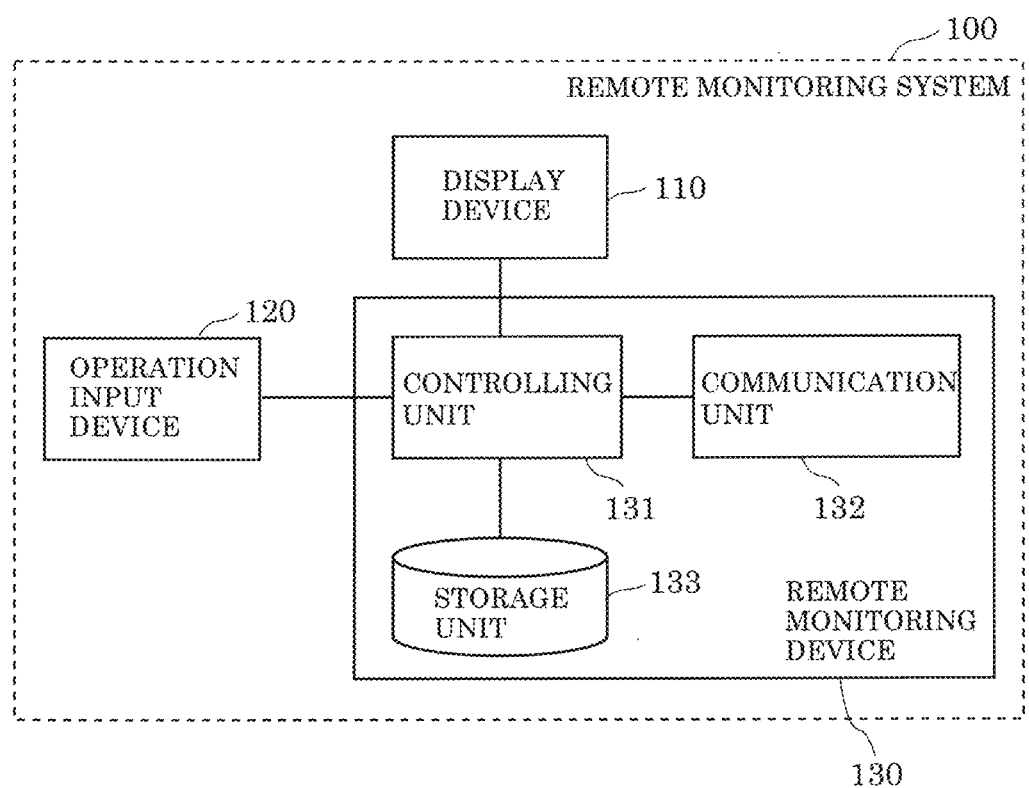
FIG. 2 illustrates a functional configuration of a remote monitoring system according to Embodiment 1.

As illustrated in FIGS. 1 and 2, remote monitoring system 100 includes display device 110, operation input device 120, and remote monitoring device 130.

Display device 110 is a monitor that is coupled to remote monitoring device 130 and that displays a video concerning monitored vehicle 200. Display device 110 displays a video captured by an imaging unit (see imaging unit 210 illustrated in FIG. 3) included in monitored vehicle 200. Display device 110 may display, to operator H, the condition of monitored vehicle 200 and of any obstruction in the surroundings of monitored vehicle 200. Thus, display device 110 may allow operator H to recognize the condition of monitored vehicle 200 and of any obstruction. A video is construed to include a moving image and a still image. An obstruction is a vehicle other than monitored vehicle 200, a person, or the like and is mainly construed to mean a moving body that could obstruct traveling of monitored vehicle 200. An obstruction may also be an immovable property fixed to the ground.

A plurality of display devices 110 may be coupled to remote monitoring device 130.

Operation input device 120 is coupled to remote monitoring device 130 and receives input for remote operation from operator H. Operation input device 120 is, for example, a steering wheel, a foot pedal (e.g., accelerator pedal and brake pedal), or the like and is for operating monitored vehicle 200. Operation input device 120 outputs input vehicle operation information to remote monitoring device 130. If monitored vehicle 200 is not to be operated remotely, remote monitoring system 100 need not include operation input device 120 for remotely operating monitored vehicle 200.

Remote monitoring device 130 is for remotely located operator H to remotely monitor monitored vehicle 200 via the communication network. As illustrated in FIG. 2, remote monitoring device 130 includes controlling unit 131, communication unit 132, and storage unit 133. In the present embodiment, remote monitoring device 130 is coupled to operation input device 120 and functions also as a remote operation device for remotely operating monitored vehicle 200.

Controlling unit 131 is a controlling device that controls various constituent elements of remote monitoring device 130. In the present embodiment, on the basis of video information of the surroundings of monitored vehicle 200 received via communication unit 132, controlling unit 131 creates a video required for operator H to monitor monitored vehicle 200 and outputs the created video to display device 110. At this point, if controlling unit 131 has received obstruction information including the current position of an obstruction from monitored vehicle 200, controlling unit 131 may create a video with additional use of the received obstruction information. For example, an obstruction in a close range of monitored vehicle 200 shown in a video may be displayed in a different color, or an obstruction in a close range of monitored vehicle 200 shown in a video may be displayed blinking. Upon having acquired vehicle operation information from operation input device 120, controlling unit 131 transmits vehicle control information (also referred to below as control information) that is based on the acquired vehicle operation information to monitored vehicle 200 via the communication network.

Controlling unit 131 may further have a real-time clock function that keeps track of the current date and time. Alternatively, controlling unit 131 may use the time identified on the basis of a Global Positioning System (GPS) signal as GPS time, or an accurate time. A GPS signal is a signal from a GPS satellite received via a GPS sensor (not illustrated). Controlling unit 131 receives a GPS signal at a predetermined interval.

Communication unit 132 is a wireless communication module for wirelessly communicating with monitored vehicle 200 via the communication network. Communication unit 132 receives, via the communication network, video information that is based on a video captured by imaging unit 210 of monitored vehicle 200. Communication unit 132 may also receive information for calculating a delay time of the communication network (specifically, round-trip time (RTT: delay time) probe packet) and vehicle information of monitored vehicle 200. Under the control of controlling unit 131, communication unit 132 transmits control information for controlling traveling of monitored vehicle 200 to monitored vehicle 200 via the communication network. The vehicle information is information held by monitored vehicle 200 concerning traveling of monitored vehicle 200. The vehicle information may include the speed and the current position of monitored vehicle 200. When monitored vehicle 200 is traveling through self-driving, the vehicle information may further include information on a target traveling route that monitored vehicle 200 would travel.

Storage unit 133 is a storage device that stores a control program to be executed by controlling unit 131. Storage unit 133 may further store video information and so on acquired via communication unit 132. Storage unit 133 may be implemented, for example, by a semiconductor memory or the like.

Although not illustrated, remote monitoring system 100 may further include an audio output device (e.g., speaker) that is coupled to remote monitoring device 130 and that outputs a warning sound to prompt operator H to pay attention to an obstruction and to make operator H aware of an upcoming risk. This configuration allows operator H to become aware that monitored vehicle 200 needs to make an emergency stop. Remote monitoring system 100 may further include an emergency stop device that is coupled to remote monitoring device 130 and that causes monitored vehicle 200 to make an emergency stop. The emergency stop device is implemented, for example, by an emergency stop button or the like. The emergency stop device outputs emergency stop information input by operator H to remote monitoring device 130. In this case, the control information may include emergency stop control information that is based on the emergency stop information.

Now, monitored vehicle 200 will be further described in detail with reference to FIG. 3. FIG. 3 illustrates a functional configuration of monitored vehicle 200 according to the present embodiment.

Figure 3:
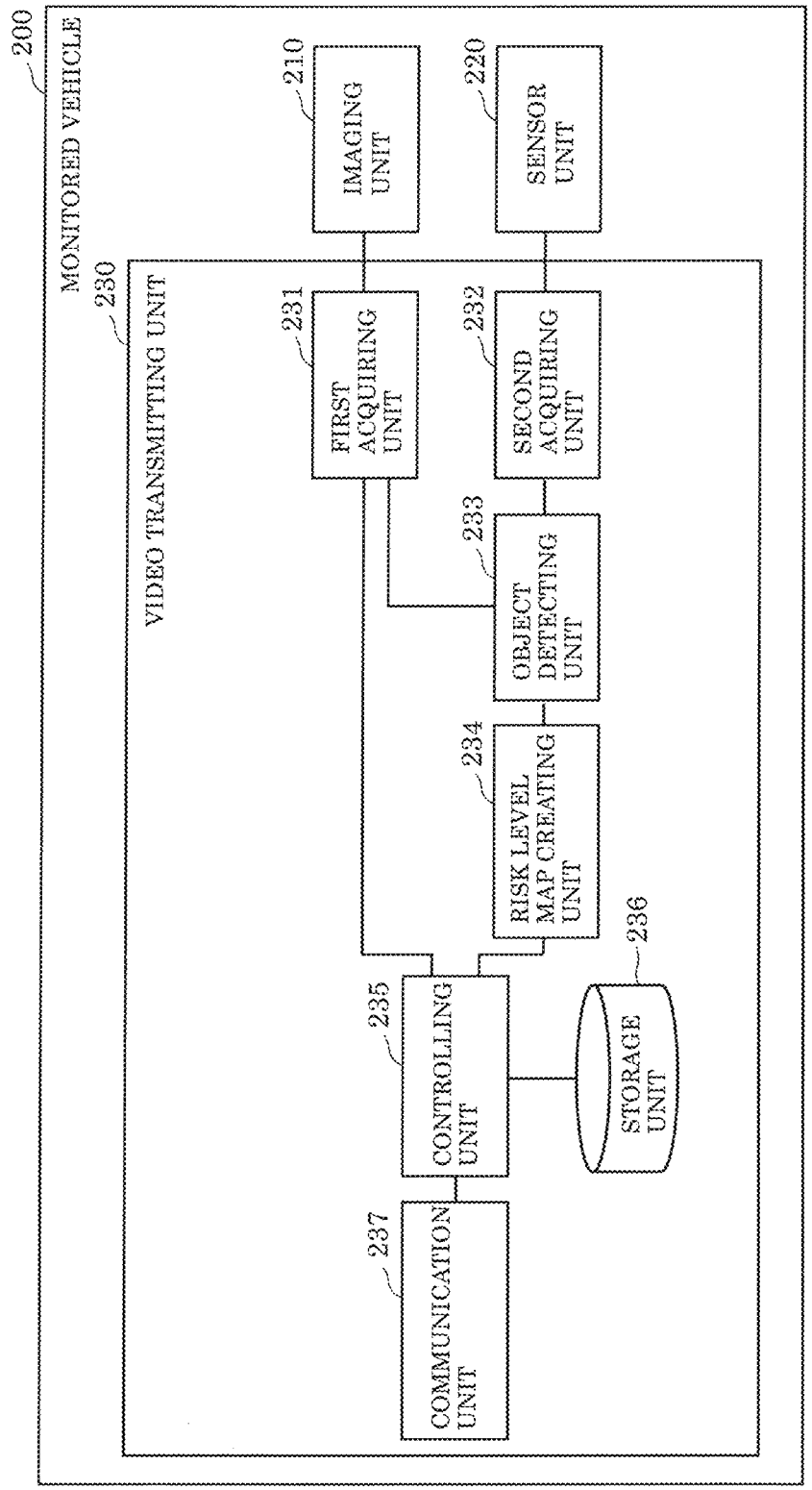
FIG. 3 illustrates a functional configuration of a monitored vehicle according to Embodiment 1.

As illustrated in FIG. 3, monitored vehicle 200 includes imaging unit 210, sensor unit 220, and video transmitting device 230. Monitored vehicle 200 is capable of autonomous traveling in accordance with traveling data held in advance in the vehicle and traveling data created on the basis of information detected by sensor unit 220 and so on. Monitored vehicle 200 is also capable of self-driving under a predetermined condition while being remotely monitored by remotely located operator H. In the present embodiment, monitored vehicle 200 is remotely monitored and remotely operated by remotely located operator H under a predetermined condition. Imaging unit 210, sensor unit 220, and video transmitting device 230 constitute an in-vehicle system equipped with functions required for self-driving.

Imaging unit 210 is a camera that captures a video of the surroundings of monitored vehicle 200. Imaging unit 210 is provided, for example, at a position where imaging unit 210 can capture images in front, back, right, and left directions from monitored vehicle 200. In other words, imaging unit 210 is so provided in monitored vehicle 200 as to be capable of capturing images of the surroundings of monitored vehicle 200. Imaging unit 210 outputs, to first acquiring unit 231, first video information that is based on a first video acquired by capturing images of the surroundings of monitored vehicle 200. Imaging unit 210 may be constituted by a plurality of cameras, for example. Imaging unit 210 does not include a camera provided to record the traveling condition of monitored vehicle 200. Imaging unit 210 is provided to capture a video to be transmitted to remote monitoring device 130 for remotely monitoring monitored vehicle 200. To rephrase, imaging unit 210 is provided to capture a video to be checked by operator H for remote monitoring.

Sensor unit 220 is a device that detects the condition of the surroundings of monitored vehicle 200. Sensor unit 220 is so provided, for example, as to be capable of detecting the conditions in the front, back, right, and left directions from monitored vehicle 200. Sensor unit 220 outputs, to second acquiring unit 232, a sensing result (sensing information) obtained by performing sensing of the surroundings of monitored vehicle 200. Sensor unit 220 is implemented by Light Detection and Ranging (LiDAR), a radar (e.g., millimeter-wave radar), an ultrasonic wave sensor, or a combination thereof. A sensing result is information concerning any obstruction in the surroundings of monitored vehicle 200.

A plurality of imaging units 210 and a plurality of sensor units 220 may be provided in monitored vehicle 200. In other words, monitored vehicle 200 may include one or more imaging units 210 and one or more sensor units 220.

Video transmitting device 230 creates, from first video information, second video information to be transmitted to monitored vehicle 200 and transmits the created second video information, in accordance with at least one of the first video information acquired from imaging unit 210 and the sensing result acquired from sensor unit 220. Video transmitting device 230 acquires, via an in-vehicle network such as the Control Area Network (CAN), information concerning traveling of monitored vehicle 200 from various sensors including imaging unit 210 and sensor unit 220 provided in monitored vehicle 200. Video transmitting device 230 acquires the first video information on the surroundings of monitored vehicle 200 from imaging unit 210 and acquires the sensing result of the surroundings of monitored vehicle 200 from sensor unit 220. Video transmitting device 230 is an example of an information processing device.

The various sensors may include a speed sensor that detects the speed of monitored vehicle 200 and a GPS sensor that detects the current position of monitored vehicle 200. Video transmitting device 230 may acquire the speed of monitored vehicle 200 from the speed sensor and acquire the current position of monitored vehicle 200 from the GPS sensor. In other words, the information concerning traveling of monitored vehicle 200 may include at least one of the speed and the current position of monitored vehicle 200. The information concerning traveling of monitored vehicle 200 is an example of the vehicle information of monitored vehicle 200. The various sensors may further include a steering angle sensor that detects the steering angle of monitored vehicle 200, a brake sensor that detects the brake level, an accelerator sensor that detects the accelerator level, and a turn signal sensor that detects the direction indicated by the turn signal.

As illustrated in FIG. 3, video transmitting device 230 includes first acquiring unit 231, second acquiring unit 232, object detecting unit 233, risk level map creating unit 234, controlling unit 235, storage unit 236, and communication unit 237.

First acquiring unit 231 is a communication interface that acquires first video information from imaging unit 210. Upon having acquired the first video information from imaging unit 210, first acquiring unit 231 outputs the acquired first video information to object detecting unit 233 and controlling unit 235.

Second acquiring unit 232 is a communication interface that acquires a sensing result from sensor unit 220. Upon having acquired the sensing result from sensor unit 220, second acquiring unit 232 outputs the acquired sensing result to object detecting unit 233.

Object detecting unit 233 detects any obstruction around monitored vehicle 200 from at least one of the first video information acquired from imaging unit 210 and the sensing result acquired from sensor unit 220 and creates obstruction information including at least one of the current position, the size, and the moving direction of the detected obstruction. Object detecting unit 233 then outputs the obstruction information to risk level map creating unit 234. The obstruction information may further include information on the acceleration of the obstruction, the speed of the obstruction, and the type of the obstruction. The type of the obstruction is, for example, for telling whether the obstruction is a pedestrian, a motorcycle, an automobile, or the like. The current position of the obstruction indicates the position of the obstruction held at the time when sensor unit 220 has sensed the obstruction.

Risk level map creating unit 234 creates a risk level map indicating any risk region in traveling of the vehicle on the basis of the obstruction information acquired from object detecting unit 233. Risk level map creating unit 234 then outputs the created risk level map to controlling unit 235. In the example described in the present embodiment, risk level map creating unit 234 creates a risk level map where a risk region in the surroundings of monitored vehicle 200 is so displayed as to be identifiable in accordance with its risk level. Alternatively, the risk level map may merely indicate whether there is any risk region. In other words, the risk level map created by risk level map creating unit 234 need not display the risk region in accordance with its risk level. Risk level map creating unit 234 is an example of a risk map creating unit, and the risk level map is an example of a risk map. The risk region is a region having a risk level of no lower than a predetermined value.

Controlling unit 235 is a controlling device that controls various constituent elements of monitored vehicle 200. In the present embodiment, controlling unit 235 creates, from the first video information captured by imaging unit 210, second video information to be transmitted to remote monitoring device 130, on the basis of the risk level map created by risk level map creating unit 234. The data amount of the second video information is no greater than the data amount of the first video information. Controlling unit 235 functions as a video creating unit that creates the second video information having a data amount smaller than the data amount of the first video information. Controlling unit 235 creates the second video information for allowing operator H to view the video of the surroundings of monitored vehicle 200 through remote monitoring system 100. The first video information may be video information corresponding to a video of a single frame or may be video information corresponding to a video of a plurality of frames, for example. A second video indicated by the second video information is, for example, a video in which at least a portion of the first video indicated by the first video information has a reduced image quality or a video in which at least a portion of the first video indicated by the first video information is cut out.

The first video information on the surroundings of monitored vehicle 200 may be created as individual pieces of first video information corresponding to the respective front, back, right, and left directions from monitored vehicle 200 or may be created as a single piece of first video information by combining videos in the front, back, right, and left directions from monitored vehicle 200, for example.

Controlling unit 235 outputs, to a travel controlling unit (not illustrated) that controls traveling of monitored vehicle 200, control information acquired from remote monitoring system 100 via communication unit 237. The travel controlling unit includes a speed controlling unit (e.g., engine control unit (ECU)) that controls the speed of monitored vehicle 200 through the operation of its accelerator, brake, and shift lever and a steering controlling unit that controls the traveling direction of monitored vehicle 200 through the operation of the steering of monitored vehicle 200.

Controlling unit 235 may have a real-time clock function that keeps track of the current date and time. Alternatively, controlling unit 235 may use the time identified on the basis of a GPS signal as GPS time, or an accurate time. A GPS signal is a signal from a GPS satellite acquired via a GPS sensor (not illustrated). Monitored vehicle 200 may include a radio-controlled clock, and controlling unit 235 may acquire the current time from the radio-controlled clock.

Storage unit 236 is a storage device that stores a control program to be executed by a processing unit such as controlling unit 235. Storage unit 236 stores, for example, map data for self-driving, route information of monitored vehicle 200, and a static risk level map. The route information is, for example, data indicating the position and the route of monitored vehicle 200 in the map data. The static risk level map is a map indicating any risk region that is created on the basis of traffic information and so on of the surroundings of monitored vehicle 200. The static risk level map will be described later in detail. The traffic information here includes traffic accident information. The traffic information may further include event information (e.g., information on student commuting hours of nearby schools, information on any outdoor event, and traffic restriction information). The traffic information may be information associated with event information that may change every moment or in real time. Storage unit 236 may be implemented, for example, by a semiconductor memory or the like.

Communication unit 237 is a wireless communication module for wirelessly communicating with remote monitoring device 130 for remotely monitoring monitored vehicle 200 via wireless base station 310 and network 300. Under the control of controlling unit 235, communication unit 237 transmits, to remote monitoring device 130, the second video information that is based on the first video information captured by imaging unit 210 via wireless base station 310 and network 300. Communication unit 237 also receives the control information concerning traveling of monitored vehicle 200 from remote monitoring device 130 via wireless base station 310 and network 300.

[1-2. Operation of Monitored Vehicle]

Figure 4:
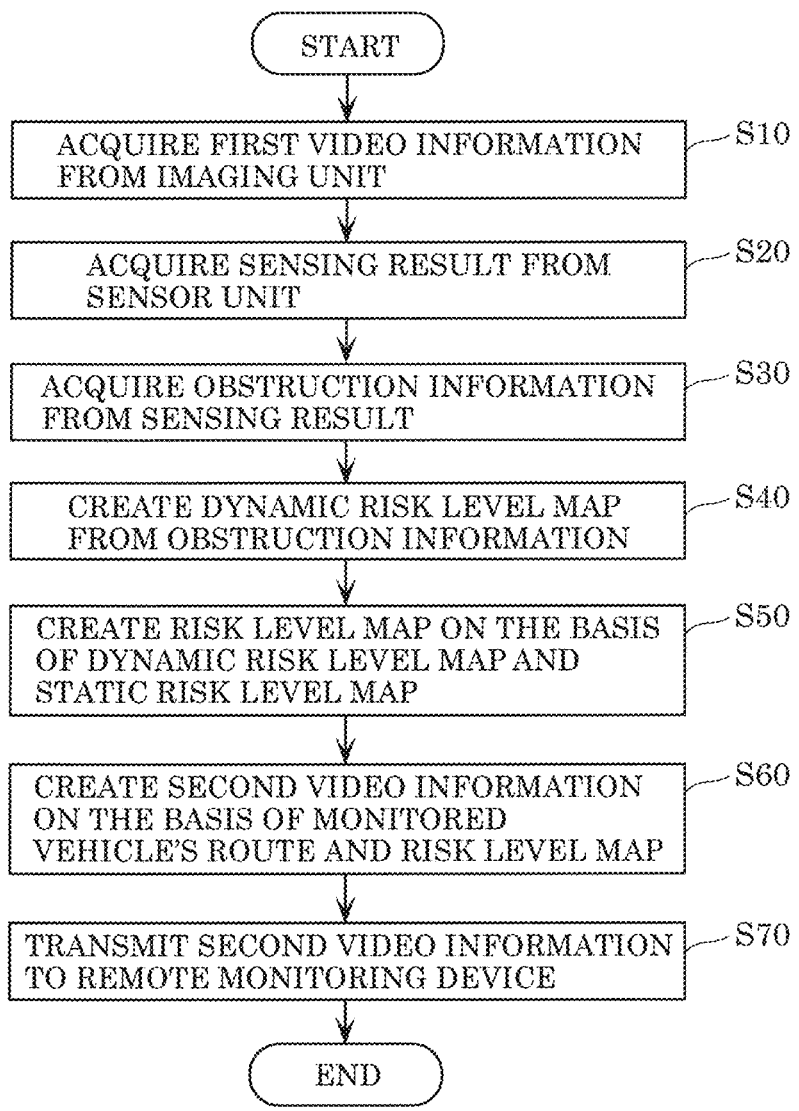
FIG. 4 is a flowchart illustrating an operation of a video transmitting device according to Embodiment 1.

Now, an operation of video transmitting device 230 included in monitored vehicle 200 will be described with reference to FIGS. 4 to 9B. FIG. 4 is a flowchart illustrating an operation of video transmitting device 230 according to the present embodiment.

As illustrated in FIG. 4, video transmitting device 230 acquires, from imaging unit 210, the first video information that is based on the first video capturing the surroundings of monitored vehicle 200 (S10). Specifically, video transmitting device 230 acquires the first video information from imaging unit 210 via first acquiring unit 231. First acquiring unit 231 outputs the acquired first video information to object detecting unit 233 and controlling unit 235.

Video transmitting device 230 also acquires, from sensor unit 220, the sensing result of sensing the surroundings of monitored vehicle 200 (S20). Specifically, video transmitting device 230 acquires the sensing result from sensor unit 220 via second acquiring unit 232. Second acquiring unit 232 outputs the acquired sensing result to object detecting unit 233.

Object detecting unit 233 creates the obstruction information from the first video information and the sensing result (S30). The obstruction information includes the current position, the size, and the moving direction of an obstruction that could obstruct traveling of monitored vehicle 200. Object detecting unit 233 outputs the created obstruction information to risk level map creating unit 234.

Figure 5:
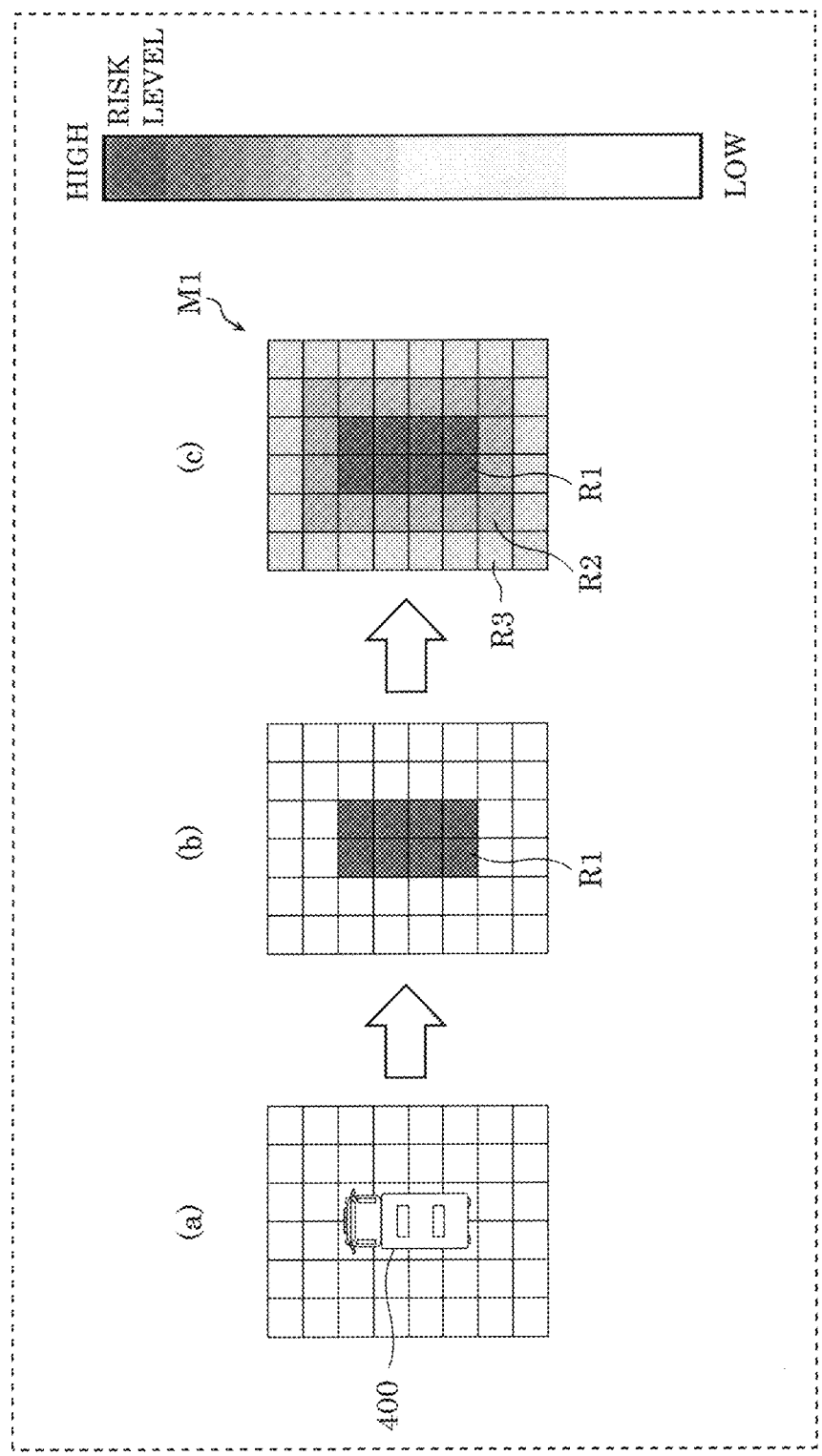
FIG. 5 illustrates a method of calculating a dynamic risk level map for a stationary obstruction according to Embodiment 1.

Risk level map creating unit 234 creates, for example, a dynamic risk level map from the obstruction information (S40). How risk level map creating unit 234 creates the dynamic risk level map will now be described with reference to FIG. 5. FIG. 5 illustrates a method of calculating a dynamic risk map for stationary obstruction 400 according to the present embodiment. FIG. 5 illustrates, as one example, a method of calculating a risk level map in which regions indicating risk levels are displayed in a two-dimensional grid map. The risk level map illustrated in FIG. 5 is, for example, a risk level map of the front of monitored vehicle 200.

As illustrated in part (a) of FIG. 5, risk level map creating unit 234 superposes obstruction 400 over the two-dimensional grid map on the basis of the current position, the size, and the type of obstruction 400 included in the obstruction information. In the example illustrated in part (a) of FIG. 5, the obstruction is a truck.

As illustrated in part (b) of FIG. 5, risk level map creating unit 234 assigns a risk level to each grid that at least partially overlaps obstruction 400 on the grid map. In the example illustrated in part (b) of FIG. 5, a risk level is assigned to region R1. Risk level map creating unit 234 may, for example, assign an equal risk level to each grid included in region R1 or assign a different risk level to each grid. For example, the risk level may be assigned such that the risk level is higher in a given grip having a larger area that overlaps obstruction 400. Risk level map creating unit 234 assigns one risk level to each grid.

As illustrated in part (c) of FIG. 5, risk level map creating unit 234 also assigns a risk level to each grid (regions R2 and R3 indicated in part (c) of FIG. 5) surrounding the grids (the grids included in region R1 indicated in part (b) of FIG. 5) to which the risk level has been assigned. Region R2 is, for example, a region surrounding region R1. Region R3 is, for example, a region surrounding region R2.

Risk level map creating unit 234 assigns, to region R2, a risk level lower than the risk level of region R1, and assigns, to region R3, a risk level lower than the risk level of region R2. In other words, risk level map creating unit 234 assigns a risk level to each grid such that the risk level is gradually lowered as the distance from region R1 increases. With this operation, dynamic risk level map M1 illustrated in part (c) of FIG. 5 is created. In part (c) of FIG. 5, a region with a higher risk level is shown darker, and the region is shown lighter as the risk level decreases. Regions R1 to R3 in dynamic risk level map M1 illustrated in part (c) of FIG. 5 are examples of a risk region.

As described above, when obstruction 400 is stationary, a grid that overlaps obstruction 400 on the grid map (i.e., a grid corresponding to the position where obstruction 400 is currently located) is assigned a higher risk level.

It is not a limitation that risk level map creating unit 234 creates the risk level map that displays regions according to their risk levels as illustrated in FIG. 5. Risk level map creating unit 234 may create a map that allows a region with a risk (e.g., region R1) to be distinguished from the remaining region as illustrated in part (b) of FIG. 5. Risk level map creating unit 234 may create a risk map to indicate that any grid that overlaps obstruction 400 is a region with a risk, for example. In this case, any grid that overlaps obstruction 400 (e.g., region R1 indicated in part (b) of FIG. 5) corresponds to a risk region.

Figure 6:
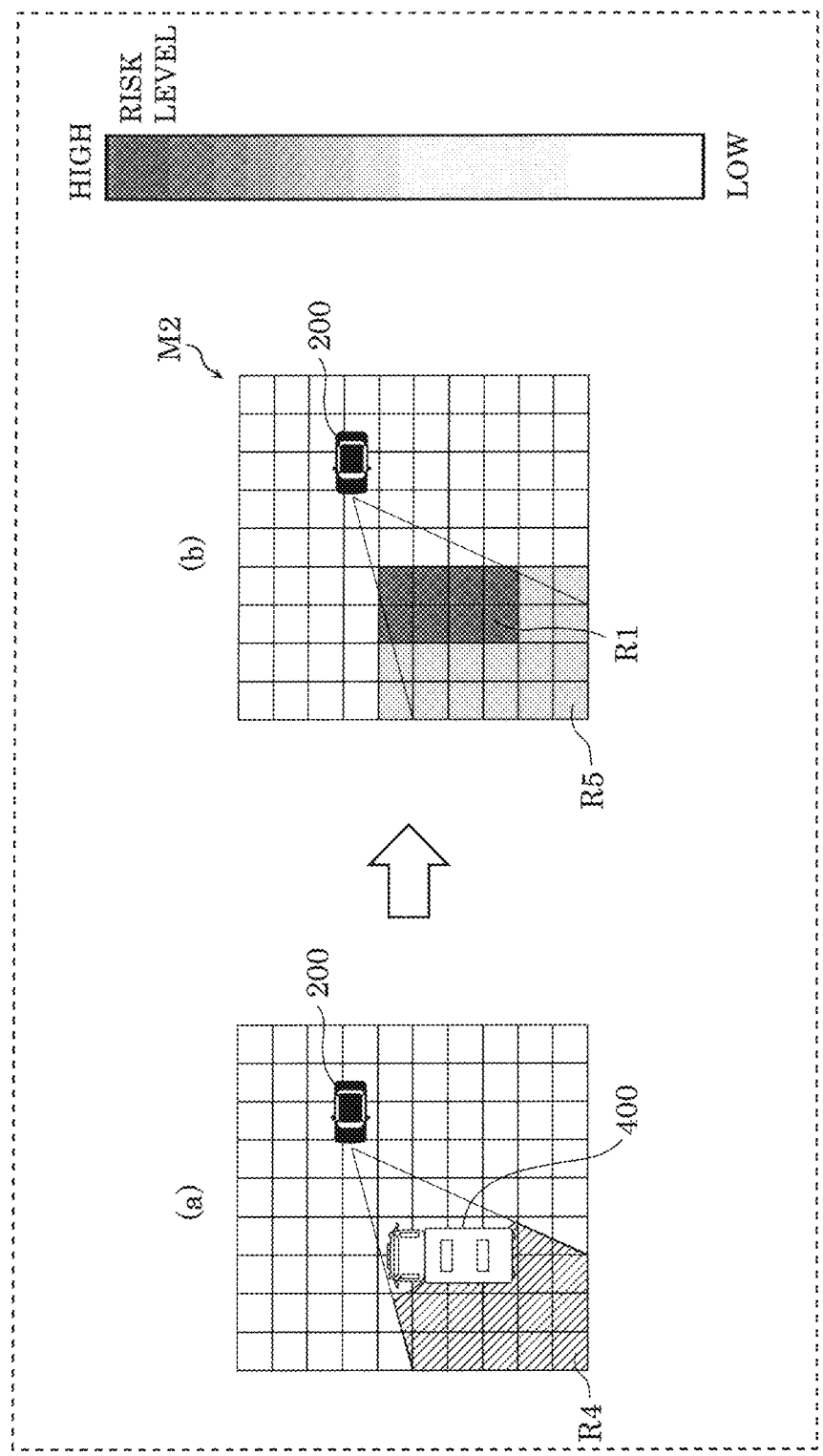
FIG. 6 illustrates a method of calculating a risk level map that takes into consideration a dead angle region behind an obstruction as viewed from the monitored vehicle according to Embodiment 1.

Risk level map creating unit 234 may create a risk level map in consideration of a dead angle region behind obstruction 400 as viewed from monitored vehicle 200. The risk level map that takes a dead angle region into consideration will be described with reference to FIG. 6. FIG. 6 illustrates a method of calculating a risk level map that takes into consideration dead angle region R4 behind obstruction 400 as viewed from monitored vehicle 200 according to the present embodiment. FIG. 6 displays also the position of the host vehicle on the grid map.

As illustrated in part (a) of FIG. 6, if obstruction 400 is present ahead of monitored vehicle 200, the region behind obstruction 400 as viewed from monitored vehicle 200 is in a dead angle from monitored vehicle 200. Thus, imaging unit 210 and sensor unit 220 fail to observe the dead angle. Therefore, risk level map creating unit 234, for example, predicts a dead angle region through the following method and creates a risk level map by assigning a risk level also to the dead angle region.

Risk level map creating unit 234 calculates the dead angle region on the basis of the positional relationship between obstruction 400 and the host vehicle (monitored vehicle 200) to thus predict the dead angle region. For example, risk level map creating unit 234 predicts that a region with hatching in part (a) of FIG. 6 is dead angle region R4. Specifically, risk level map creating unit 234 predicts, on the basis of the positional relationship between obstruction 400 and the host vehicle, that dead angle region R4 is a region contained between a straight line connecting the host vehicle and one end of obstruction 400 corresponding to one end of dead angle region R4 (the upper left end of obstruction 400 illustrated in part (a) of FIG. 6) and another straight line connecting the host vehicle and another end of obstruction 400 corresponding to another end of dead angle region R4 (the lower right end of obstruction 400 illustrated in part (a) of FIG. 6). Risk level map creating unit 234 may predict dead angle region R4 in a method different from the one described above. Dead angle region R4 is an unobservable region that can be observed with neither imaging unit 210 nor sensor unit 220.

As illustrated in part (b) of FIG. 6, if dead angle region R4 illustrated in part (a) of FIG. 6 is present, risk level map creating unit 234 assigns a risk level to each grid corresponding to dead angle region R4 on the grid map. Risk level map creating unit 234 uniquely assigns a risk level to each grid that at least partially is in dead angle region R4. Risk level map creating unit 234 may assign, to each grid within dead angle region R4, a risk level lower than the risk level assigned to region R1 that at least partially overlaps obstruction 400, for example. With this operation, dynamic risk level map M2 that includes regions R1 and R5 illustrated in part (b) of FIG. 6 is created. Region R5 is a region corresponding to dead angle region R4. For example, in dynamic risk level map M2, regions R1 and R5 are examples of a risk region.

Figure 7:
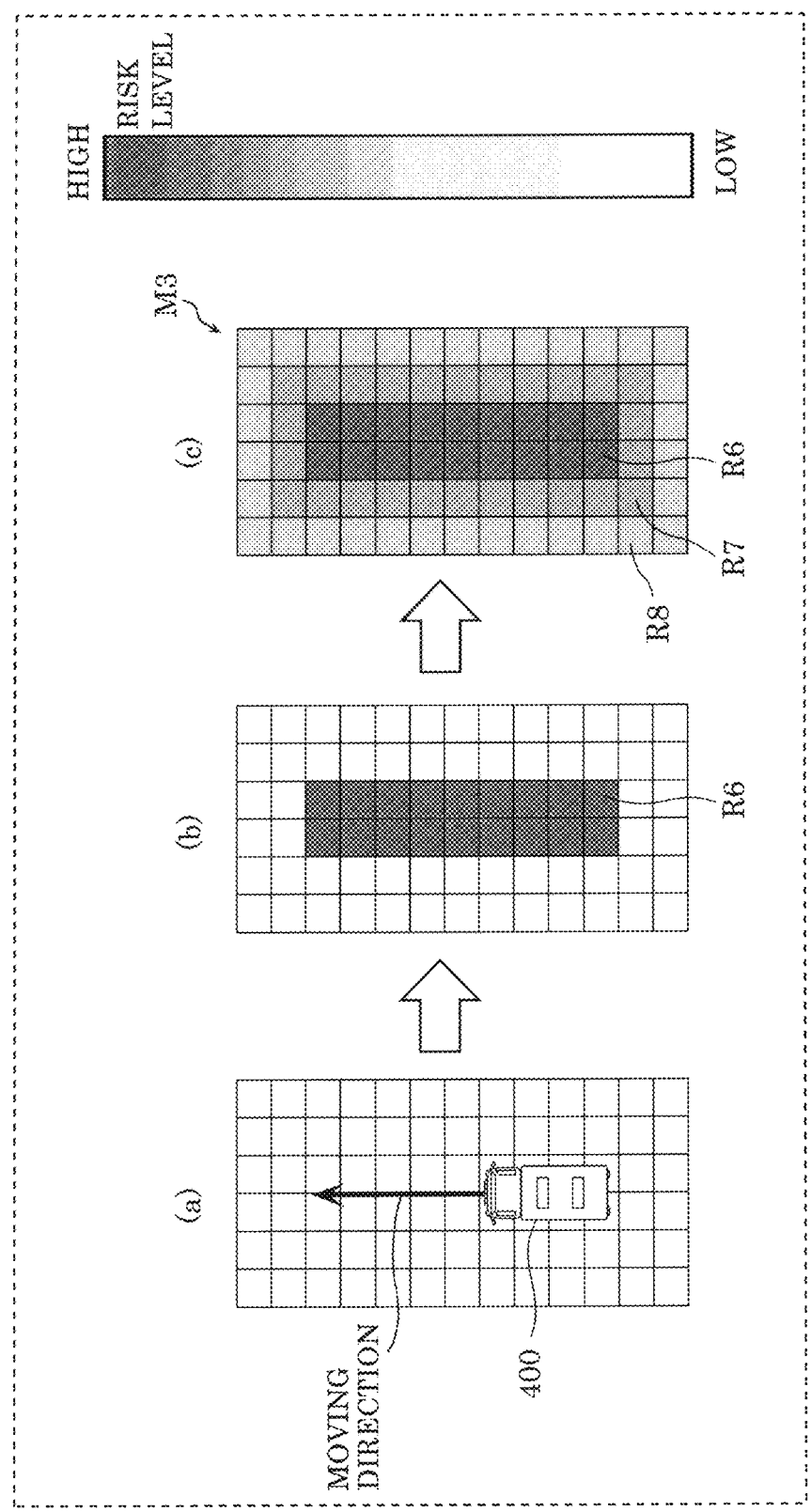
FIG. 7 illustrates a method of calculating a dynamic risk level map for a moving obstruction according to Embodiment 1.

In the foregoing, how a risk level map for stationary obstruction 400 is created has been described. How a risk level map for moving obstruction 400 is created will now be described with reference to FIG. 7. FIG. 7 illustrates a method of calculating a dynamic risk level map for moving obstruction 400 according to the present embodiment. In FIG. 7, the risk level map is created with additional use of the moving direction of obstruction 400 included in the obstruction information.

As illustrated in part (a) of FIG. 7, risk level map creating unit 234 superposes obstruction 400 over the two-dimensional grid map on the basis of the current position, the size, and the type of obstruction 400 included in the obstruction information. The arrow indicated in part (a) of FIG. 7 expresses the moving direction of obstruction 400 that is based on the traveling direction included in the obstruction information.

As illustrated in part (b) of FIG. 7, risk level map creating unit 234 assigns a risk level to a grid in consideration of movement of obstruction 400. Risk level map creating unit 234 assigns a risk level, for example, to each grid that at least partially overlaps obstruction 400 on the grid map and to each grid located in the moving direction of obstruction 400. In the example illustrated in part (b) of FIG. 7, a risk level is assigned to region R6. Risk level map creating unit 234 may, for example, assign an equal risk level to each grid included in region R6 or assign a different risk level to a grid where obstruction 400 is currently located than to a grid located in the moving direction of obstruction 400. For example, a grid where obstruction 400 is currently located may be assigned a risk level higher than the risk level assigned to a grid located in the moving direction of obstruction 400. The range of region R6 may be determined in accordance with the distance that obstruction 400 moves in a predetermined duration (e.g., several seconds), for example. Region R6 may be formed by the current position of obstruction 400, the position (calculated position) of obstruction 400 to be held when a predetermined duration has passed, and the region between the current position and the calculated position. The distance that obstruction 400 moves may be calculated with use of the speed of obstruction 400 acquired from the sensing result of sensor unit 220.

As illustrated in part (c) of FIG. 7, risk level map creating unit 234 also assigns a risk level to each grid (regions R7 and R8 indicated in part (c) of FIG. 7) surrounding the grids (the grids included in region R6 indicated in part (b) of FIG. 7) to which the risk level has been assigned. Risk level map creating unit 234 assigns, to region R7, a risk level lower than the risk level of region R6, and assigns, to region R8, a risk level lower than the risk level of region R7. In other words, risk level map creating unit 234 assigns a risk level to each grid such that the risk level is gradually lowered as the distance from region R6 increases. With this operation, dynamic risk level map M3 illustrated in part (c) of FIG. 7 is created. For example, in dynamic risk level map M3, regions R6 to R8 are examples of a risk region.

As described above, when obstruction 400 is moving, a grid that overlaps obstruction 400 on the grid map and a grid located in the moving direction are assigned a higher risk level.

For the dynamic risk level map for moving obstruction 400, as in the case of the dynamic risk level map for stationary obstruction 400, risk level map creating unit 234 may create a risk level map in consideration of a dead angle region. In this case, the positional relationship between monitored vehicle 200 and obstruction 400 changes as obstruction 400 moves, and thus the dead angle region changes every moment.

Figure 8:
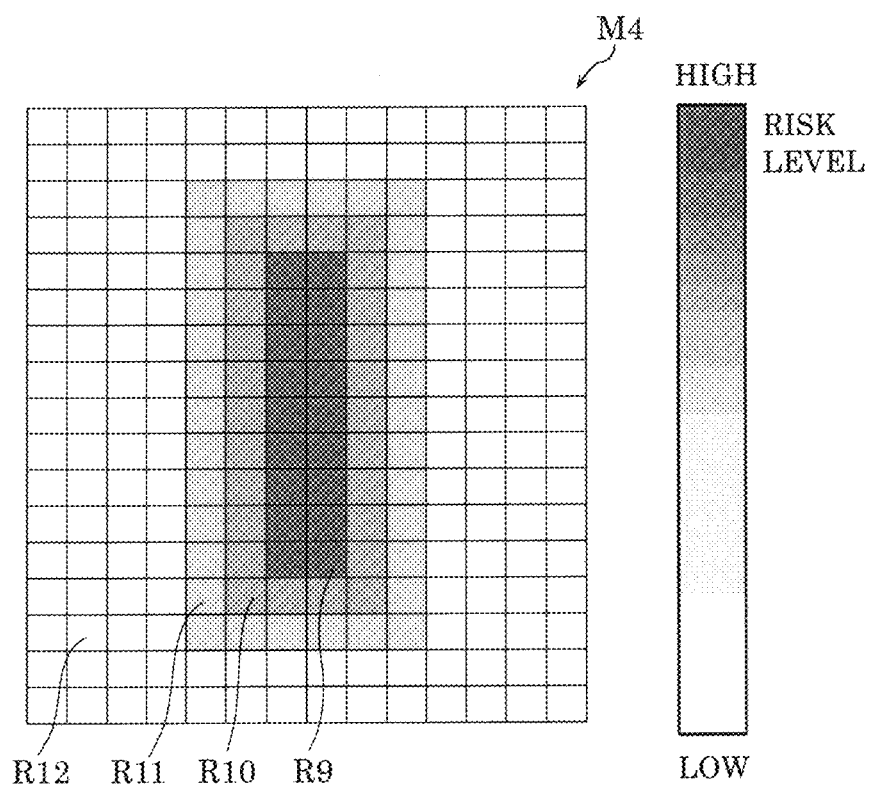
FIG. 8 illustrates a static risk level map according to Embodiment 1.

Referring back to FIG. 4, risk level map creating unit 234 creates a risk level map for monitored vehicle 200 on the basis of a dynamic risk level map (e.g., dynamic risk level maps M1 to M3) and a static risk level map (S50). A static risk level map will now be described with reference to FIG. 8. FIG. 8 illustrates static risk level map M4 according to the present embodiment. Static risk level map M4 is created without use of the obstruction information from object detecting unit 233. To rephrase, static risk level map M4 is created with use of neither the first video information nor the sensing result.

As illustrated in FIG. 8, static risk level map M4 is created on the basis of traffic information and so on of the surroundings of monitored vehicle 200. Static risk level map M4 may be created, for example, on the basis of traffic accident information serving as the traffic information. Static risk level map M4 may be stored, for example, in storage unit 236. Static risk level map M4 may be created in advance by risk level map creating unit 234 on the basis of the traffic information and so on or may be received from the outside via communication unit 237.

In static risk level map M4, a risk level is assigned to a grid corresponding to a location where a traffic accident has occurred, for example. In FIG. 8, region R9 indicates a location where a traffic accident has occurred. In static risk level map M4, a risk level is assigned also to each grid (regions R10 and R11 illustrated in FIG. 8) surrounding the grids (the grids included in region R9 illustrated in FIG. 8) to which the risk level has been assigned. For example, a risk level lower than the risk level of region R9 is assigned to region R10, and a risk level lower than the risk level of region R10 is assigned to region R11. In other words, in static risk level map M4, the risk level is assigned such that the risk level is gradually lowered as the distance from region R9 increases.

Region R12 surrounds region R11 and is assigned a risk level lower than the risk level of region R11. Region R12 need not be assigned any risk level. In other words, the risk level of each grid included in region R12 may be zero. A grid at a predetermined distance from region R9 or a grid away from region R9 by a predetermined number of grids need not be assigned the risk level that is based on region R9. This may also be applied to a dynamic risk level map (e.g., dynamic risk level maps M1 to M3). Regions R9 to R11 are examples of a risk region.

In static risk level map M4, when the traffic information is traffic accident information, for example, a higher risk level may be assigned as the frequency of traffic accidents is higher or as the damage caused by traffic accidents is greater.

Risk level map creating unit 234 computes the risk level assigned to each grid of the dynamic risk level map and the risk level assigned to each grid of static risk level map M4 to thus create a risk level map for monitored vehicle 200. The computation may include at least one of addition, subtraction, multiplication, and division. In the present embodiment, risk level map creating unit 234 creates the risk level map for monitored vehicle 200 by adding the risk levels. Risk level map creating unit 234 adds the risk level of a given grid in the dynamic risk level map and the risk level of the corresponding grid in the static risk level map to thus calculate one risk level for this grid. Risk level map creating unit 234 may use the mean value of the risk level of a given grid in the dynamic risk level map and the risk level of the corresponding grid in the static risk level map as the risk level of this grid in the risk level map. The computation may include selecting one risk level from a plurality of risk levels. Risk level map creating unit 234 may use the higher one of the risk level of a given grid in the dynamic risk level map and the risk level of the corresponding grid in the static risk level map as the risk level of this grid in the risk level map.

Risk level map creating unit 234 outputs the created risk level map to controlling unit 235.

Figure 9A:
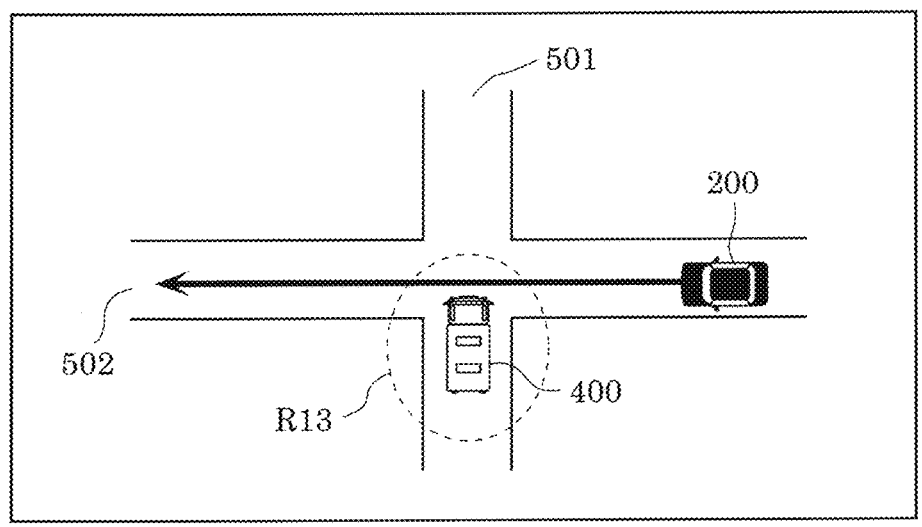
FIG. 9A is an image diagram illustrating a case in which a traveling route overlaps a risk region according to Embodiment 1.

Controlling unit 235 creates the second video information from the first video information on the basis of the traveling route of monitored vehicle 200 and the risk level map (S60). A case in which the traveling route of monitored vehicle 200 overlaps a risk region in the risk level map, that is, a case in which the traveling route of monitored vehicle 200 crosses a risk region will be described with reference to FIG. 9A. FIG. 9A is an image diagram illustrating a case in which the traveling route overlaps a risk region (region R13 illustrated in FIG. 9A) according to the present embodiment. In other words, FIG. 9A is an image diagram in which the risk level map and the traveling route are superposed on each other.

In the example illustrated in FIG. 9A, monitored vehicle 200 is traveling on road 502 in the direction of the arrow, and obstruction 400 is present on road 501. Region R13 corresponds to a risk region of obstruction 400. Region R13 is, for example, a region having a risk level of no lower than a predetermined value in the risk level map created through the computation of the dynamic risk level map and the static risk level map. The position where monitored vehicle 200 is indicated in FIG. 9A is the current position of monitored vehicle 200. The arrow in FIG. 9A indicates the traveling route of monitored vehicle 200.

As illustrated in FIG. 9A, the traveling route of monitored vehicle 200 overlaps region R13 at an intersection where roads 501 and 502 intersect each other. In other words, the risk region is present in the traveling route of monitored vehicle 200. In this case, it is desirable that a video capturing the traveling route (the space ahead of monitored vehicle 200 in the example illustrated in FIG. 9A) to be displayed on display device 110 be clear, so that operator H can make an accurate determination or can remotely monitor monitored vehicle 200 accurately. Therefore, it is desired that monitored vehicle 200 transmit, to remote monitoring device 130, a video capturing its traveling route with as little image quality degradation as possible while reducing wasted network band.

When the risk region in the risk level map is in the route of monitored vehicle 200, for example, controlling unit 235 creates, from the first video information, the second video information having a data amount smaller than the data amount of the first video information. Controlling unit 235 creates the second video information, for example, by at least one of degrading, in the first video indicated by the first video information, the image quality of a video of a first region corresponding to a region other than the risk region indicated in the risk level map to an image quality lower than the image quality of a video of a second region corresponding to the risk region and cutting out the video of the second region from the first video indicated by the first video information. The image quality of the video of the second region need not be degraded. In other words, controlling unit 235 may create the second video information by degrading the image quality of only the video of the first region of the first video indicated by the first video information.

When the risk region is present ahead of monitored vehicle 200, for example, controlling unit 235 creates the second video information by at least one of degrading, of the videos capturing the front, back, right, and left directions from monitored vehicle 200 captured by imaging unit 210, the image quality of the videos capturing the back, right, and left directions (an example of the first region) to an image quality lower than the image quality of the video capturing the front direction (an example of the second region) and cutting out the video capturing the front direction from the videos capturing the front, back, right, and left directions from monitored vehicle 200 captured by imaging unit 210.

Controlling unit 235 may acquire the traveling route of monitored vehicle 200 on the basis of the route information stored in storage unit 236. If controlling unit 235 is being remotely operated by operation input device 120 through remote monitoring device 130, controlling unit 235 may acquire the traveling route in the remote operation from the control information received from remote monitoring device 130. In other words, controlling unit 235 may create the second video information with use of the traveling route of monitored vehicle 200 that is based on the control information received from operation input device 120 via remote monitoring device 130.

In this case, controlling unit 235 may change the second video information to be created in accordance with the received control information, that is, in accordance with the content of operation by operator H. Controlling unit 235 may also create the second video information by at least one of degrading, in the first video information, the image quality of a video of a third region capturing a direction that is not the traveling direction in the traveling route that is based on the control information to an image quality lower than the image quality of a video of a fourth region capturing the traveling direction and cutting out the video of the fourth region from the first video information.

In one case described as an example, a risk region is present ahead of monitored vehicle 200, and monitored vehicle 200 changes lanes to the right in accordance with the control information. In this case, controlling unit 235 may create the second video information, on the basis of the risk level map and the traveling route from the control information, such that the image quality of the videos capturing the back, right, and left directions (an example of the first region) is degraded to an image quality lower than the image quality of the video capturing the front direction (an example of the second region) but, of the back, right, and left directions, the image quality of the video capturing the right direction (an example of the fourth region) is degraded less than the image quality of the videos capturing the back and left directions (an example of the third region). Controlling unit 235 may create the second video information such that the videos of the second region and the fourth region have a substantially equal image quality, for example. Controlling unit 235 may create the second video information without degrading the image quality of the videos of the second region and the fourth region.

When monitored vehicle 200 is traveling through self-driving, controlling unit 235 may create the second video information with use of the target traveling route that this monitored vehicle 200 would travel. In this case, controlling unit 235 may change the second video information to be created in accordance with the traveling route in self-driving. This second video information is created in a method similar to that in the case in which the second video information is created in accordance with the content of operation by operator H.

Controlling unit 235 transmits the created second video information to remote monitoring device 130 via communication unit 237 (S70). When the second video information has been created with the videos of the second region and the fourth region cut out from the first video, the second video information that is based on the video of regions having a risk level of no lower than a predetermined value is transmitted to remote monitoring device 130.

Figure 9B:
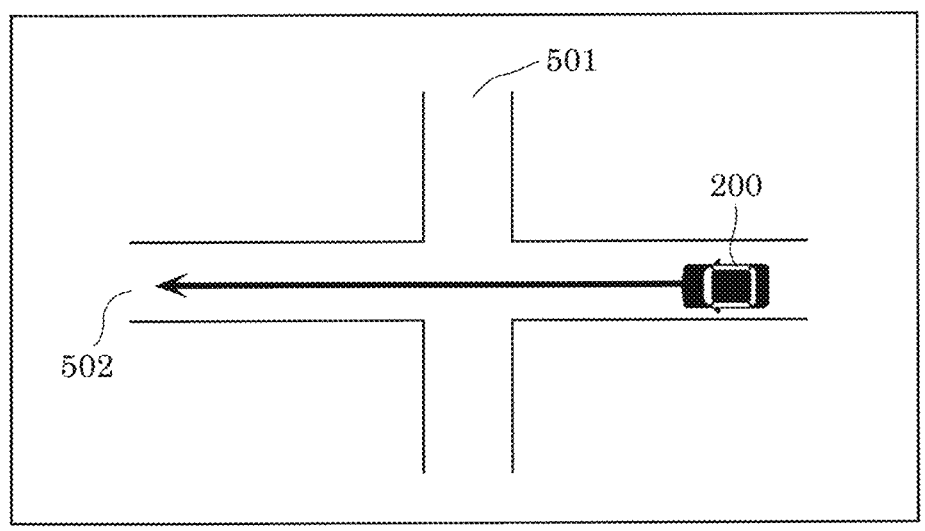
FIG. 9B is an image diagram illustrating a case in which a traveling route does not overlap any risk region according to Embodiment 1.

A case in which the traveling route of monitored vehicle 200 does not overlap any risk region in the risk level map, that is, a case in which monitored vehicle 200 does not pass through any risk region will be described with reference to FIG. 9B. FIG. 9B is an image diagram illustrating a case in which the traveling route does not overlap any risk region according to the present embodiment. In FIG. 9B, monitored vehicle 200 is traveling on road 502 in the direction of the arrow.

As illustrated in FIG. 9B, no risk region is present in the traveling route of monitored vehicle 200. When no risk region is present in the risk level map, controlling unit 235 may create the second video information by uniformly degrading the image quality of the first video indicated by the first video information. When no risk region is present in the risk level map, controlling unit 235 may also refrain from creating the second video information. In other words, when no risk region is present in the risk level map, video transmitting device 230 may refrain from transmitting the second video information to remote monitoring device 130. When no risk region is present in the risk level map, video transmitting device 230 may transmit at least one of the sensing result and the obstruction information to remote monitoring device 130.

Controlling unit 235 can reduce wasted network band between monitored vehicle 200 and remote monitoring device 130 by adjusting the data amount of the video to be transmitted to remote monitoring device 130 in accordance with the risk level of the surroundings of monitored vehicle 200.

The method of calculating the risk level in the dynamic risk level map and in the static risk level map is not limited to the one described above, and any method that allows the risk level of a collision or the like between monitored vehicle 200 and obstruction 400 to be calculated may be employed. The method of creating the risk level map is not limited to the one described above, and any method that allows a risk region in the surroundings of monitored vehicle 200 to be displayed may be employed. The risk level map may be displayed in the form of a three-dimensional grid map, may be created with a risk region superposed on the first video captured by imaging unit 210, or may be created with a risk region superposed on map information stored in storage unit 236 or acquired from the outside, for example.

In the example described above, the risk level map is created from the dynamic risk level map and the static risk level map, but this is not a limiting example. The risk level map may be created with use of at least one of the dynamic risk level map and the static risk level map. The dynamic risk level map may be used as the risk level map, or static risk level map M4 may be used as the risk level map. When static risk level map M4 is used as the risk level map, risk level map creating unit 234 creating the risk level map from the traffic information includes retrieving static risk level map M4 created by risk level map creating unit 234 with use of the traffic information stored in storage unit 236.

If controlling unit 235 has received the control information including the emergency stop control information from remote monitoring device 130, controlling unit 235 may transmit, to remote monitoring device 130, the first video captured by imaging unit 210 without degrading its image quality.

As described thus far, video transmitting device 230 is a video transmitting device to be provided in monitored vehicle 200 (an example of a vehicle), and video transmitting device 230 includes first acquiring unit 231 that acquires first video information from imaging unit 210 that captures images of the surroundings of monitored vehicle 200, risk level map creating unit 234 (an example of a risk map creating unit) that creates a risk map indicating a risk region in the surroundings of monitored vehicle 200, controlling unit 235 (an example of a video creating unit) that creates second video information having a data amount smaller than the data amount of the first video information on the basis of the risk map, and communication unit 237 that transmits the second video information to remote monitoring device 130 for remotely monitoring monitored vehicle 200.

With this configuration, video transmitting device 230 creates the second video information to be transmitted to remote monitoring device 130 in accordance with the risk region in the surroundings of monitored vehicle 200. Video transmitting device 230, for example, creates the second video information by degrading the image quality of a video of a region other than the risk region and can thus reduce the data amount. In other words, video transmitting device 230 transmits the second video information and can thus reduce the amount of network band used to transmit video information to remote monitoring device 130 as compared to the case in which the first video information is transmitted. Accordingly, with video transmitting device 230, wasted network band between monitored vehicle 200 and remote monitoring device 130 can be reduced.

Embodiment 2

A video transmitting device and so on according to the present embodiment will be described below with reference to FIGS. 10 to 13.

[2-1. Configuration of Monitored Vehicle]

Figure 10:
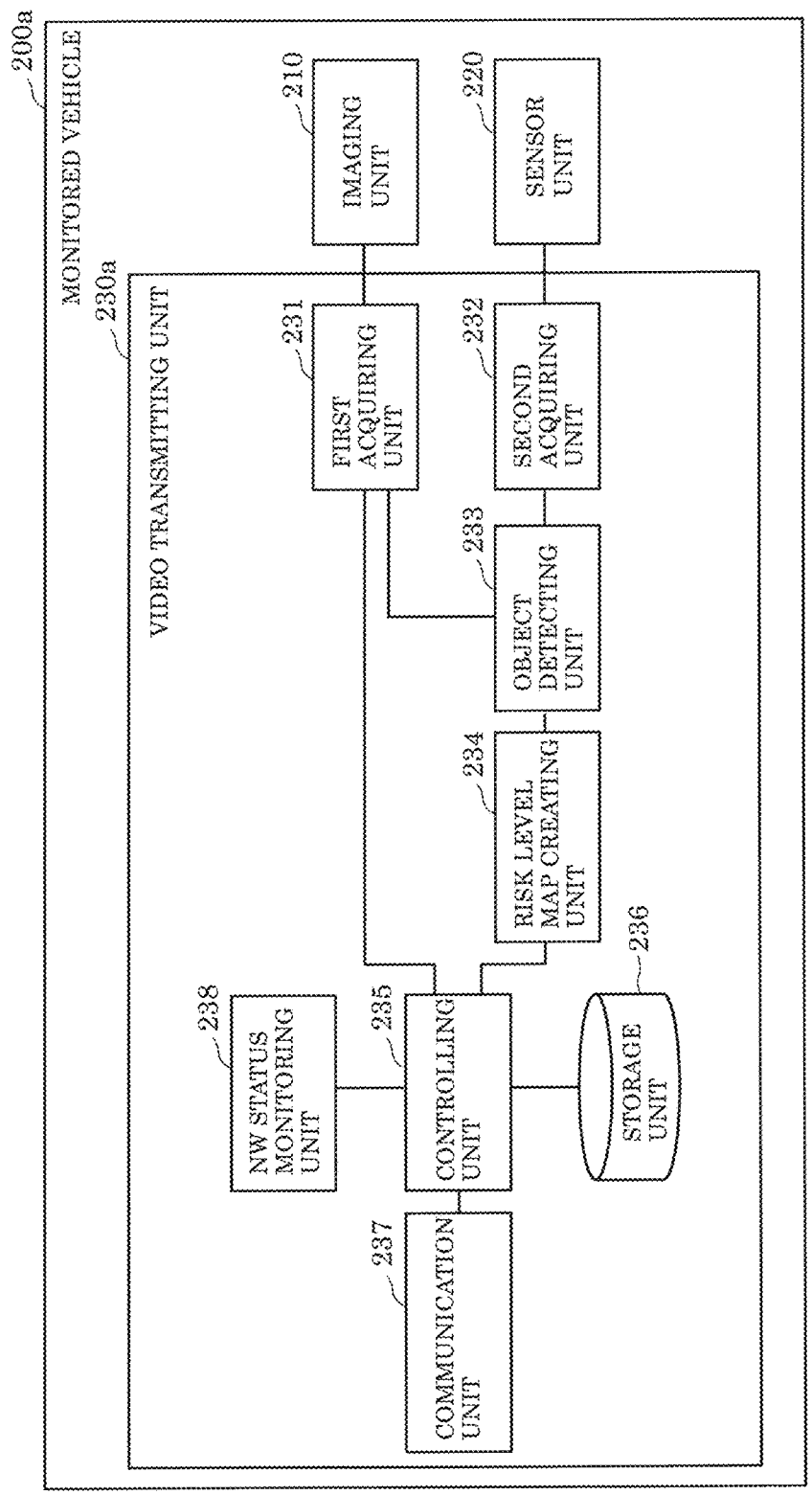
FIG. 10 illustrates a functional configuration of a monitored vehicle according to Embodiment 2.

A configuration of a monitored vehicle provided with a video transmitting device according to the present embodiment will be described first with reference to FIG. 10. FIG. 10 illustrates a functional configuration of monitored vehicle 200a according to the present embodiment.

As illustrated in FIG. 10, monitored vehicle 200a includes imaging unit 210, sensor unit 220, and video transmitting device 230a. Video transmitting device 230a includes a network (NW) status monitoring unit 238, in addition to the components of video transmitting device 230 according to Embodiment 1. In the present embodiment, differences from Embodiment 1, that is, NW status monitoring unit 238 included in video transmitting device 230a will mainly be described.

NW status monitoring unit 238 monitors the status of a communication network between monitored vehicle 200a and remote monitoring device 130. Specifically, NW status monitoring unit 238 determines whether the communication network is congested. NW status monitoring unit 238 is an example of a determining unit. A feature of the present embodiment lies in that controlling unit 235 creates a different video in accordance with the determination result of NW status monitoring unit 238.

NW status monitoring unit 238 determines whether the communication network is congested with use of at least one of a packet loss rate and a delay time of the communication network, for example. The packet loss rate is the rate of packet loss that occurs unexpectedly due to an influence such as noise. The delay time is the time required for information to be transmitted between monitored vehicle 200a and remote monitoring device 130. An increased packet loss rate or an increased delay time increases the time it takes for operator H to come to view the second video that is based on the second video information since monitored vehicle 200a has transmitted the second video information. This leads to an increase in the distance that monitored vehicle 200a travels until operator H receives the control information since monitored vehicle 200a has transmitted the second video information to remote monitoring device 130, leading to a higher risk of accident. Therefore, even when the communication network is congested, video transmitting device 230a needs to transmit the second video information to remote monitoring device 130 in a short period of time. Accordingly, in the present embodiment, when the communication network is congested, video transmitting device 230a transmits, to remote monitoring device 130, second video information having a data amount smaller than the data amount of the first video information corresponding to the first video captured by imaging unit 210. The process of video transmitting device 230a will be described later.

Figure 11:
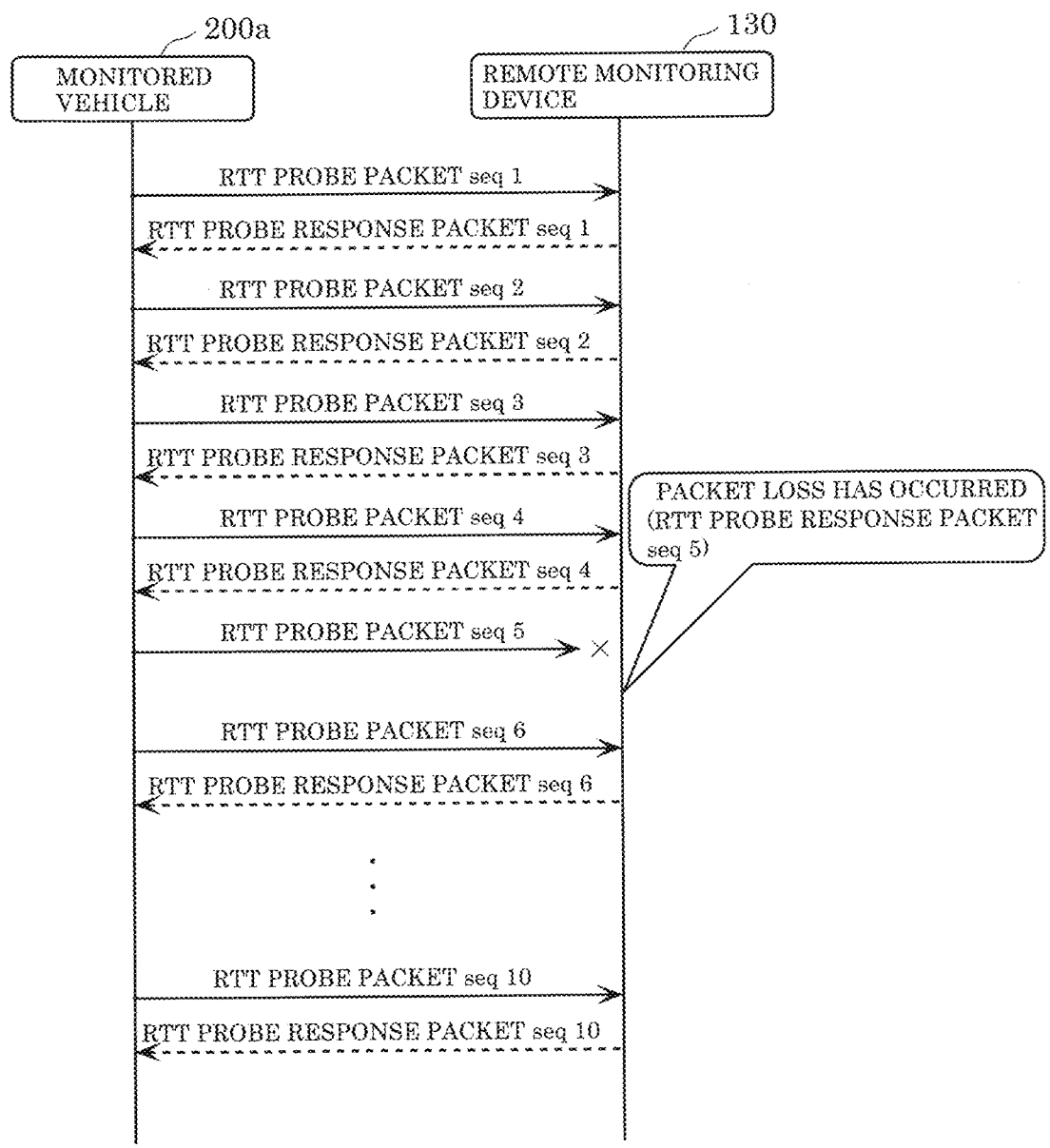
FIG. 11 is a sequence diagram illustrating an operation for calculating a packet loss rate between the monitored vehicle and a remote monitoring device according to Embodiment 2.

Now, the packet loss rate and the delay time of the communication network will be described with reference to FIGS. 11 to 12B. The packet loss rate of the communication network will be described first with reference to FIG. 11. FIG. 11 is a sequence diagram illustrating an operation for calculating the packet loss rate between monitored vehicle 200a and remote monitoring device 130 according to the present embodiment.

As illustrated in FIG. 11, monitored vehicle 200a transmits an RTT probe packet to remote monitoring device 130 at every first period in order to calculate the packet loss rate between monitored vehicle 200a and remote monitoring device 130, that is, the packet loss rate of the communication network. For example, NW status monitoring unit 238 transmits an RTT probe packet to remote monitoring device 130 via controlling unit 235 and communication unit 237. Each RTT probe packet is given a different sequence number. In the example illustrated in FIG. 11, RTT probe packets with respective sequence numbers seq 1 to seq 10 are transmitted. Upon having received an RTT probe packet from monitored vehicle 200a, remote monitoring device 130 transmits, to monitored vehicle 200a, an RTT probe response packet with the sequence number included in the received RTT probe packet. NW status monitoring unit 238 determines that packet loss has occurred if NW status monitoring unit 238, after having transmitted an RTT probe packet with a sequence number (e.g., seq 1) to remote monitoring device 130, fails to receive the RTT probe response packet with the same sequence number (e.g., seq 1) within a second period. The second period may be shorter than the first period, for example. The first period is, for example, one second.

NW status monitoring unit 238 calculates the packet loss rate from the condition of receiving RTT probe response packets within a predetermined duration. Specifically, NW status monitoring unit 238 calculates the packet loss rate on the basis of the number of times an RTT probe packet is transmitted within the predetermined duration (also referred to below as the packet transmission count) and the number of times NW status monitoring unit 238, after transmitting an RTT probe packet, fails to receive an RTT probe response packet corresponding to the transmitted RTT probe packet within the second period (also referred to below as the packet reception failure count). To be more specific, NW status monitoring unit 238 calculates the packet loss rate by dividing the packet reception failure count by the packet transmission count. The packet loss rate is expressed in percentage, for example.

In the example illustrated in FIG. 11, the packet transmission count is 10, and the packet reception failure count is 1 (specifically, once for RTT probe response packet seq 5). Thus, the packet loss rate is 10%.

NW status monitoring unit 238 determines that the communication network is congested if the packet loss rate is no lower than a predetermined value. NW status monitoring unit 238 may determine that the communication network is congested if the packet loss rate is no lower than 30%, for example.

Figure 12A:
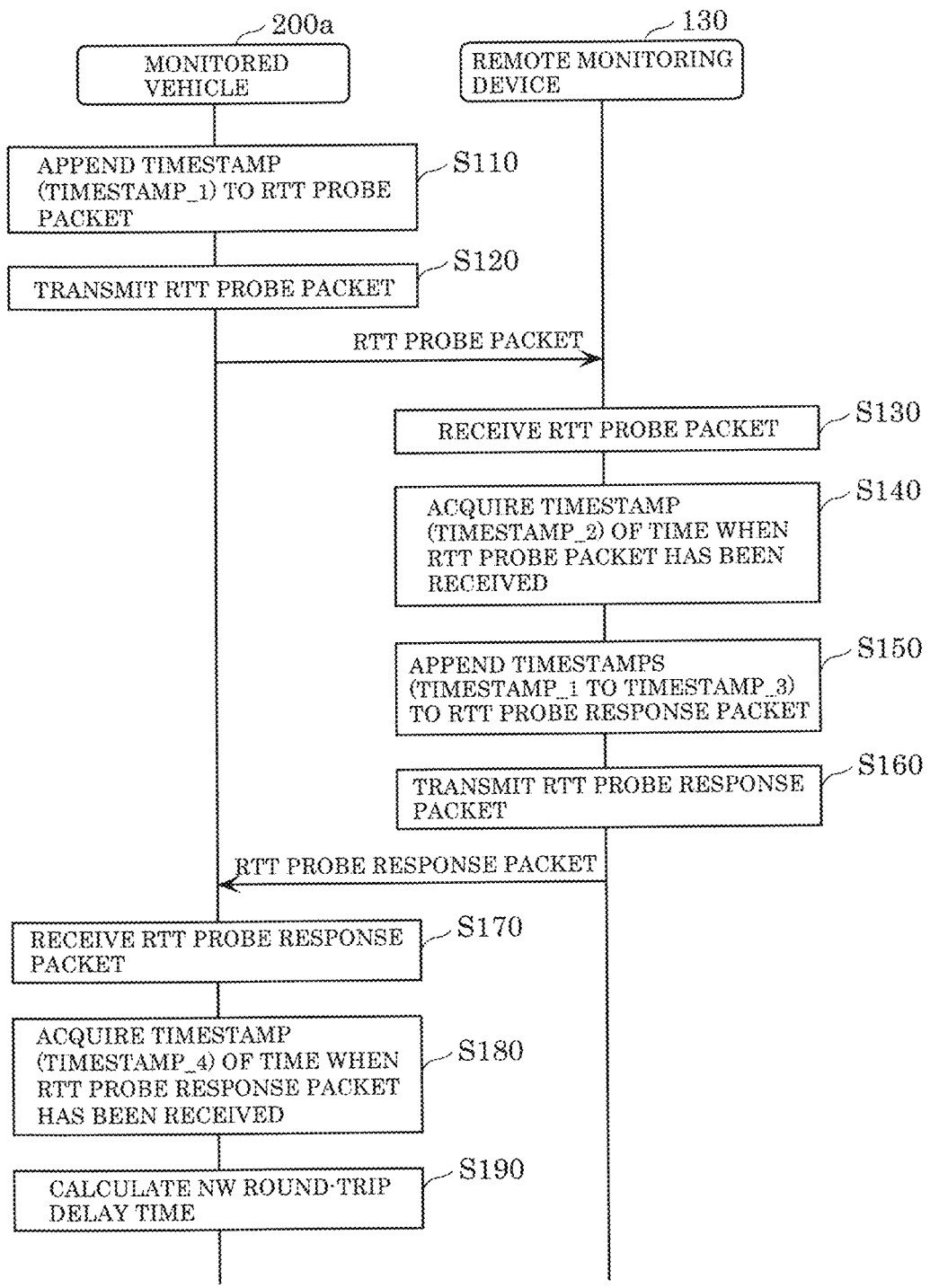
FIG. 12A is a sequence diagram illustrating an example of an operation for acquiring an NW delay time according to Embodiment 2.

Now, the delay time of the communication network will be described with reference to FIGS. 12A and 12B. FIGS. 12A and 12B illustrate a case in which, as an example of the delay time, a round-trip delay time is calculated. FIG. 12A is a sequence diagram illustrating an example of an operation for acquiring the delay time of the NW (communication network) according to the present embodiment. Referring to FIG. 12A, how the delay time is acquired in a case in which the times are synchronized between monitored vehicle 200a and remote monitoring device 130 will be described. That the times are synchronized means, for example, a case in which the GPS time is used as the time in monitored vehicle 200a and the time in remote monitoring device 130, a case in which monitored vehicle 200a and remote monitoring device 130 each include a radio-controlled clock, or the like. In the case described below, monitored vehicle 200a and remote monitoring device 130 each include a GPS sensor (not illustrated). The GPS time means the time information included in a radio wave received by a GPS sensor from a satellite.

As illustrated in FIG. 12A, monitored vehicle 200a first appends a timestamp (timestamp_1) to an RTT probe packet (S110). For example, NW status monitoring unit 238 performs the process in step S110. NW status monitoring unit 238 acquires, from the GPS sensor, the time when the RTT probe packet is to be transmitted as timestamp_1 and writes timestamp_1 into the RTT probe packet. NW status monitoring unit 238 then transmits the RTT probe packet to remote monitoring device 130 via communication unit 237 (S120).

Remote monitoring device 130 receives the RTT probe packet (S130). Controlling unit 131 acquires a timestamp (timestamp_2) of the time when the RTT probe packet has been received on the basis of the time information received by the GPS sensor (S140). Controlling unit 131 appends timestamps (timestamp_1 to timestamp_3) to an RTT probe response packet that is a response to the RTT probe packet (S150). Controlling unit 131 acquires, from the GPS sensor, the time when the RTT probe response packet is to be transmitted as timestamp_3 and writes timestamp_3 into the RTT probe response packet. Controlling unit 131 then transmits the RTT probe response packet to monitored vehicle 200a via communication unit 132 (S160).

NW status monitoring unit 238 receives the RTT probe response packet via communication unit 237 (S170). NW status monitoring unit 238 acquires a timestamp (timestamp_4) of the time when the RTT probe response packet has been received (S180). NW status monitoring unit 238 acquires timestamp_4 on the basis of the time information received by the GPS sensor. NW status monitoring unit 238 then calculates an NW round-trip delay time with use of the timestamps (timestamp_1 to timestamp_4) (S190). NW status monitoring unit 238 calculates the NW round-trip delay time by subtracting a difference between timestamp_2 and timestamp_3 from a difference between timestamp_1 and timestamp_4, for example.

Now, how the delay time is acquired in a case in which the times are not synchronized between monitored vehicle 200a and remote monitoring device 130 will be described with reference to FIG. 12B. FIG. 12B is a sequence diagram illustrating another example of an operation for acquiring the delay time of the NW according to the present embodiment. Steps S210 to S230 illustrated in FIG. 12B are similar to steps S110 to 130 illustrated in FIG. 12A, and thus descriptions thereof will be omitted.

Figure 12B:
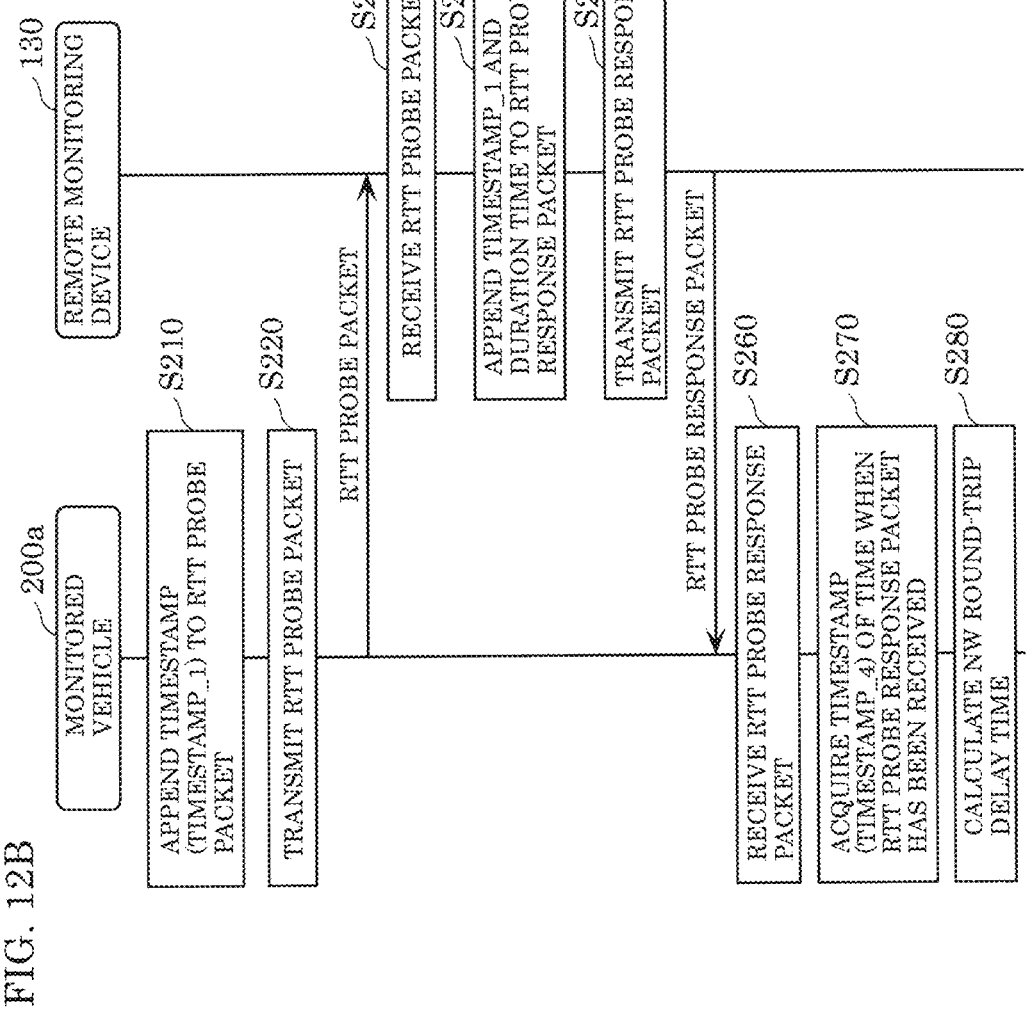
FIG. 12B is a sequence diagram illustrating another example of an operation for acquiring an NW delay time according to Embodiment 2.

As illustrated in FIG. 12B, monitored vehicle 200a appends timestamp_1 and duration time to an RTT probe response packet (S240). Duration time is a duration required for the process of remote monitoring device 130 from when an RTT probe packet is received to when an RTT probe response packet is transmitted. Duration time is calculated, for example, through a real-time clock function of controlling unit 131. Controlling unit 131 transmits the RTT probe response packet to monitored vehicle 200a via communication unit 132 (S250).

NW status monitoring unit 238 of monitored vehicle 200a receives the RTT probe response packet via communication unit 237 (S260). NW status monitoring unit 238 acquires a timestamp (timestamp_4) of the time when the RTT probe response packet has been received (S270). NW status monitoring unit 238 then calculates an NW round-trip delay time with use of the timestamps (timestamp_1 and timestamp_4) and the duration time (S280). NW status monitoring unit 238 calculates the NW round-trip delay time by subtracting the duration time from a difference between timestamp_1 and timestamp_4, for example.

NW status monitoring unit 238 determines that the communication network is congested if the delay time is no shorter than a predetermined value. NW status monitoring unit 238 may determine that the communication network is congested if the delay time is no shorter than 500 ms, for example.

In the examples described above, the round-trip delay time is calculated by subtracting the processing time in monitored vehicle 200a (e.g., the difference between timestamp_2 and timestamp_3 illustrated in FIG. 12A or the duration time illustrated in FIG. 12B), but these examples are not limiting. The round-trip delay time may be calculated from a difference between timestamp_1 and timestamp_4, for example.

In the examples described above, the delay time is the round-trip delay time. Alternatively, the delay time may be a one-way delay time (e.g., the duration from when an RTT probe packet is transmitted by monitored vehicle 200a to when the RTT probe packet is received by remote monitoring device 130).

NW status monitoring unit 238 may store the transmission time of a packet associated with the sequence number of this packet into storage unit 236 without writing the transmission time directly into the packet. Then, in step S190 or S280, NW status monitoring unit 238 may retrieve the transmission time from storage unit 236 and calculate the round-trip delay time with use of the retrieved transmission time and the reception time when the RTT probe response packet has been received.

Calculation of the communication network status including at least one of the packet loss rate and the delay time is executed iteratively at a predetermined interval. NW status monitoring unit 238 may store the calculated communication network status into storage unit 236, for example.

NW status monitoring unit 238 may acquire at least one of the packet loss rate and the delay time by receiving the status of the communication network between monitored vehicle 200a and remote monitoring device 130 from another device via communication unit 237. NW status monitoring unit 238 may acquire the packet loss rate by receiving the packet loss rate from remote monitoring device 130, for example.

[2-2. Operation of Monitored Vehicle]

Now, an operation of video transmitting device 230a will be described with reference to FIG. 13. FIG. 13 is a flowchart illustrating an operation of video transmitting device 230a according to the present embodiment. Steps S310 to S350 illustrated in FIG. 13 are similar to steps S10 to S50 illustrated in FIG. 14 of Embodiment 1, and thus descriptions thereof will be omitted.

NW status monitoring unit 238 acquires the status of the NW (communication network) (S360). NW status monitoring unit 238 acquires, as the NW status, at least one of the packet loss rate and the delay time of the NW. NW status monitoring unit 238 may acquire at least one of the packet loss rate and the delay time of the NW by calculating at least one of the packet loss rate and the delay time of the NW through the operations illustrated in FIGS. 11 to 12B. Alternatively, NW status monitoring unit 238 may acquire at least one of the packet loss rate and the delay time of the NW by retrieving at least one of the packet loss rate and the delay time of the NW from storage unit 236.

NW status monitoring unit 238 may calculate the packet loss rate from the most recent packet transmission count and packet reception failure count held at the time when the first video information has been acquired in step S310 or at the time when the sensing result has been acquired in step S320. NW status monitoring unit 238 may calculate the packet loss rate from the packet transmission count and the packet reception failure count held during a period that goes back in time by a third period from when the first video information or the sensing result is received. Alternatively, NW status monitoring unit 238 may calculate the packet loss rate from the packet reception failure count in the most recent predetermined packet transmission count (e.g., 10, etc.) held prior to the time when the first video information is acquired in step S310 or the time when the sensing result is acquired in step S320.

NW status monitoring unit 238 may calculate the delay time from the condition of receiving the most recent RTT probe response packet held at the time when the first video information is acquired in step S310 or at the time when the sensing result is acquired in step S320. NW status monitoring unit 238 may calculate the delay time from a plurality of RTT probe response packets during a period that goes back in time by a third period from when the first video information or the sensing result is acquired, for example. NW status monitoring unit 238 may use, as the delay time of the NW, the longest delay time of a plurality of delay times calculated with use of the plurality of RTT probe response packets or the mean value of the plurality of delay times, for example.

NW status monitoring unit 238 determines whether the NW is congested from the acquired NW status (S370). NW status monitoring unit 238 determines that the NW is congested If at least one of the packet loss rate and the delay time is no less than a predetermined value, for example.

If NW status monitoring unit 238 has determined that the NW is congested (Yes in S370), controlling unit 235 adjusts a transmission rate (bit rate) for transmitting video information to remote monitoring device 130 (S380). Specifically, controlling unit 235 lowers the transmission rate if NW status monitoring unit 238 has determined that the NW is congested. Controlling unit 235, for example, changes the transmission rate from a current first transmission rate to a second transmission rate that is lower than the first transmission rate. Controlling unit 235 may change the amount of adjusting the transmission rate in accordance with the congestion level of the NW, for example. Controlling unit 235 may lower the second transmission rate more as the congestion level of the NW is higher, that is, as the value of at least one of the packet loss rate and the delay time is greater. Storage unit 236 may hold a table indicating a relationship between the congestion level of the NW and the second transmission rate, and controlling unit 235 may adjust the second transmission rate with use of this table.

Controlling unit 235 creates the second video information with a data amount reduced in accordance with the second transmission rate adjusted in step S380 (S390). Controlling unit 235 changes the data amount of the video information to be transmitted to remote monitoring device 130 in accordance with the second transmission rate. Controlling unit 235, for example, creates the second video information such that the second video information has such a data amount that allows the second video information to be transmitted within a predetermined time period at the adjusted second transmission rate (also referred to below as an adjusted data amount). Controlling unit 235 creates, for example, the second video information with the adjusted data amount by at least one of degrading, in the first video information, the image quality of the video of the first region corresponding to the region other than the risk region indicated in the risk level map to an image quality lower than the image quality of the video of the second region corresponding to the risk region and cutting out the video of the second region from the first video information. The image quality of the video of the second region need not be degraded. In other words, controlling unit 235 may create the second video information by degrading the image quality of only the video of the first region in the first video indicated by the first video information.

Controlling unit 235 then transmits the second video information created in step S390 to remote monitoring device 130 (S400). Controlling unit 235 transmits the second video information to remote monitoring device 130 at the second transmission rate via communication unit 237.

If NW status monitoring unit 238 has determined that the NW is not congested (No in S370), controlling unit 235 creates the second video information that is based on the first video information. The second video information created when the result is No in step S370 has a data amount greater than the data amount of the second video information created when the result is Yes in step S370. The second video information may be created with no reduction in the data amount from the first video information, for example. In other words, controlling unit 235 may use the first video information as the second video information to be transmitted to remote monitoring device 130 (S410).

Controlling unit 235 then transmits the second video information created in step S410 to remote monitoring device 130 (S400). Controlling unit 235 transmits the second video information to remote monitoring device 130 at the first transmission rate via communication unit 237. When the NW is not congested, controlling unit 235 may transmit, to remote monitoring device 130, the first video information as the second video information without reducing the data amount of the first video information. If NW status monitoring unit 238 has determined that the NW is congested, for example, communication unit 237 may transmit the second video information to remote monitoring device 130. If NW status monitoring unit 238 has determined that the NW is not congested, communication unit 237 may transmit the first video information to remote monitoring device 130.

As described above, video transmitting device 230a changes the data amount of the second video information to be transmitted to remote monitoring device 130 in accordance with the risk region indicated in the risk level map and the NW status. This can reduce wasted network band while suppressing a decrease in the real-timeness of the second video information.

In the example described above, controlling unit 235 adjusts the transmission rate if NW status monitoring unit 238 has determined that the NW is congested, but this example is not limiting. Controlling unit 235 may create the second video information with a reduced data amount from the first video information without adjusting the transmission rate when NW status monitoring unit 238 has determined that the NW is congested.

As described above, video transmitting device 230a further includes NW status monitoring unit 238 (an example of a determining unit) that determines whether the communication network between monitored vehicle 200 (an example of a vehicle) and remote monitoring device 130 is congested. If NW status monitoring unit 238 has determined that the communication network is congested, communication unit 237 transmits the second video information to remote monitoring device 130. If NW status monitoring unit 238 has determined that the communication network is not congested, communication unit 237 transmits the first video information to remote monitoring device 130.

Thus, video transmitting device 230a transmits the second video information having a data amount smaller that the data amount of the first video information when the communication network is congested. In other words, video transmitting device 230a transmits the second video information when the communication network is congested and can thus reduce the amount of network band used to transmit video information to remote monitoring device 130 as compared to the case in which the first video information is transmitted. Operator H can promptly view the video that is based on the second video information even when the communication network is congested. Accordingly, video transmitting device 230a can, while reducing wasted network band, inform operator H of any risk in traveling in a shorter period of time as compared to the case in which the first video information is transmitted.

Variation 1 of Embodiment 2

Figure 14:
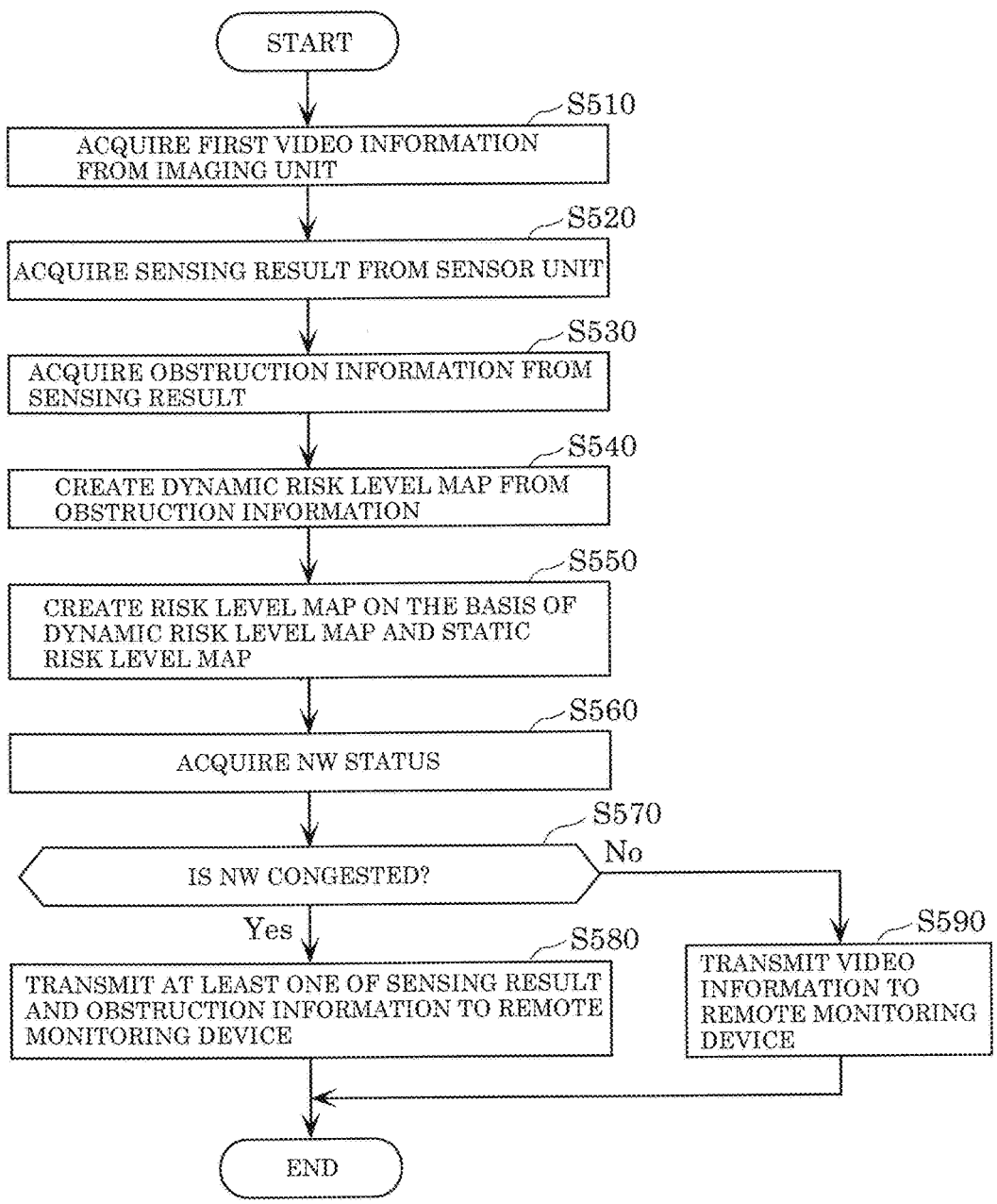
FIG. 14 is a flowchart illustrating an operation of a video transmitting device according to Variation 1 of Embodiment 2.

A video transmitting device and so on according to the present variation will be described below with reference to FIG. 14. A monitored vehicle according to the present variation has a configuration similar to that of monitored vehicle 200a according to Embodiment 2, and thus descriptions thereof will be omitted. In the present variation, object detecting unit 233 outputs the generated obstruction information to risk level map creating unit 234 and controlling unit 235. An operation of such video transmitting device 230a will be described below. FIG. 14 is a flowchart illustrating an operation of video transmitting device 230a according to the present variation. Steps S510, S520, and S540 to S570 illustrated in FIG. 14 are similar to steps S310, S320, and S340 to S370 illustrated in FIG. 13, and thus descriptions thereof will be omitted.

As illustrated in FIG. 14, object detecting unit 233 creates obstruction information from the sensing result to thus acquire the obstruction information (S530). Object detecting unit 233 creates the obstruction information, for example, from the first video information and the sensing result. The obstruction information includes at least one of the current position, the size, and the moving direction of an obstruction that could obstruct traveling of monitored vehicle 200a. Object detecting unit 233 outputs the created obstruction information to risk level map creating unit 234 and controlling unit 235.

If NW status monitoring unit 238 has determined that the NW is congested (Yes in S570), controlling unit 235 transmits at least one of the sensing result and the obstruction information to remote monitoring device 130 (S580). To rephrase, controlling unit 235 forbids transmission of video information if NW status monitoring unit 238 has determined that the NW is congested. Herein, sensor unit 220 is a sensor other than imaging unit 210 and is, for example, a radar, an ultrasonic wave sensor, LiDAR, or the like. At least one of the sensing result and the obstruction information is also referred to below as non-video information.

In this manner, controlling unit 235 according to the present variation transmits, of the video information captured by imaging unit 210 and the non-video information, only the non-video information to remote monitoring device 130 if there is a restriction on the communication band, for example.

Controlling unit 235 may transmit preferentially a sensing result acquired by a sensor with a smaller information amount to remote monitoring device 130 when the sensing result is to be transmitted with a restriction on the communication band. Controlling unit 235 may, for example, transmit only the sensing result acquired by a sensor with an information amount smaller than a predetermined information amount to remote monitoring device 130 when the sensing result is to be transmitted with a restriction on the communication band. The predetermined information amount may be preset, or if the communication band is restricted stepwise, the predetermined information amount may be set in accordance with each step.

That the NW is congested may mean that the communication band is restricted to an extent that the video captured by imaging unit 210 is disrupted, for example.

If NW status monitoring unit 238 has determined that the NW is not congested (No in S570), controlling unit 235 transmits the video information to remote monitoring device 130 (S590). The video information may be the first video information acquired in step S510 or may be the second video information generated on the basis of the first video information. The second video information is video information generated from the first video information by reducing the data amount of the first video information, for example. The second video information may be a video capturing, of the directions from monitored vehicle 200a, the traveling direction of monitored vehicle 200a, for example. The video information may include, as additional information, at least one of the obstruction information detected by object detecting unit 233 and the sensing result (sensor information) of sensor unit 220. For example, when the video information includes a video capturing, of the directions from monitored vehicle 200a, the traveling direction of monitored vehicle 200a, the obstruction information or the sensing result in the direction other than the traveling direction (e.g., the back, right, or left direction from monitored vehicle 200a) may be included in the video information as the additional information.

As described above, video transmitting device 230a according to the present variation includes first acquiring unit 231 that acquires first video information from imaging unit 210 that captures images of the surroundings of monitored vehicle 200a (an example of a vehicle), second acquiring unit 232 that acquires a sensing result from sensor unit 220 that performs sensing of the surroundings of monitored vehicle 200a, object detecting unit 233 that creates obstruction information indicating the position and the speed of an obstruction on the basis of the sensing result and the first video information, risk level map creating unit 234 that creates a risk map indicating a risk region in the surroundings of monitored vehicle 200a, controlling unit 235 (an example of a video creating unit) that creates second video information on the basis of the risk map, communication unit 237 that transmits monitoring information to be transmitted to remote monitoring device 130 for remotely monitoring monitored vehicle 200a, and NW status monitoring unit 238 (an example of a determining unit) that determines whether the communication network between monitored vehicle 200a and remote monitoring device 130 is congested. Communication unit 237 transmits the monitoring information including at least one of the sensing result, the obstruction information, and the second video information selected on the basis of the determination result of NW status monitoring unit 238.

If NW status monitoring unit 238 has determined that the communication network is congested, communication unit 237, for example, transmits at least one of the sensing result and the obstruction information to remote monitoring device 130. If NW status monitoring unit 238 has determined that the communication network is not congested, communication unit 237 transmits the second video information to remote monitoring device 130.

In the present variation, object detecting unit 233 outputs the obstruction information to risk level map creating unit 234 and controlling unit 235. If NW status monitoring unit 238 has determined that the communication network between monitored vehicle 200a and remote monitoring device 130 is not congested (No in S570), controlling unit 235 transmits, of the video information and the non-video information, at least the video information to remote monitoring device 130 via communication unit 237. In step S580, in addition to the video information, the non-video information (e.g., at least one of the obstruction information and the sensor information) may be further transmitted.

If NW status monitoring unit 238 has determined that the communication network between monitored vehicle 200a and remote monitoring device 130 is congested (Yes in S570), controlling unit 235 transmits information with a transmission amount smaller than the transmission amount of the information (e.g., video information) to be transmitted in step S590. For example, controlling unit 235 transmits, of the video information and the non-video information, only the non-video information to remote monitoring device 130 via communication unit 237 (S580).

In this manner, by limiting the information to be transmitted to remote monitoring device 130 when the communication band is restricted to the information on the obstruction detected by sensor unit 220 or the like, information on the surroundings of monitored vehicle 200a can be transmitted to remote monitoring device 130 at an even lower transmission rate.

When sensor unit 220 is constituted by a plurality of types of sensors, controlling unit 235 acquires the sensing result of each of the plurality of types of sensors. Then, controlling unit 235 may transmit, of the sensing results of the respective types of sensors, only the sensing result detected by a predetermined sensor to remote monitoring device 130. The predetermined sensor is a sensor with an information amount smaller than a predetermined information amount. The predetermined sensor is, for example, a radar, an ultrasonic wave sensor, or the like other than LiDAR, but these are not limiting examples.

Variation 2 of Embodiment 2

Figure 15:
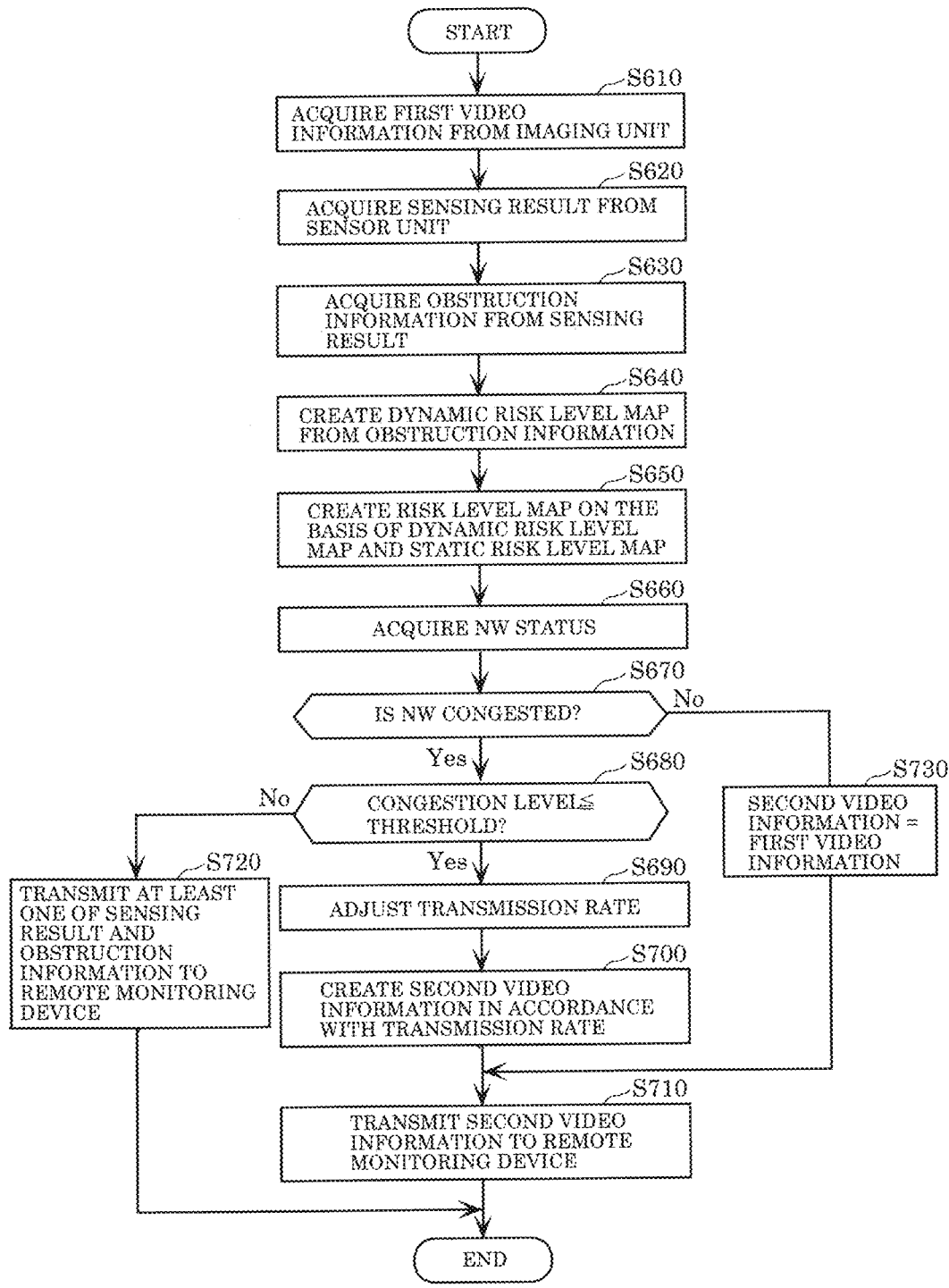
FIG. 15 is a flowchart illustrating an operation of a video transmitting device according to Variation 2 of Embodiment 2.

A video transmitting device and so on according to the present variation will be described below with reference to FIG. 15. A monitored vehicle provided with the video transmitting device according to the present variation has a configuration similar to that in Variation 1, and thus descriptions thereof will be omitted. FIG. 15 is a flowchart illustrating an operation of video transmitting device 230a according to the present variation. Processes in steps S610 to S670 illustrated in FIG. 15 are similar to the processes in steps S510 to S570 illustrated in FIG. 14, and thus descriptions thereof will be omitted.

If NW status monitoring unit 238 has determined that the NW is not congested (No in S670), controlling unit 235 creates the second video information to be transmitted to remote monitoring device 130. The second video information created when the result is No in step S670 has a data amount greater than the data amount of the second video information created when the result is Yes in steps S670 and S680. Controlling unit 235 creates the second video information on the basis of the first video information. The second video information may be created with no reduction in the data amount from the first video information, for example. In other words, controlling unit 235 may use the first video information as the second video information to be transmitted to remote monitoring device 130 (S730). Controlling unit 235 may create the second video information from the first video information by reducing the data amount of the first video information, for example.

If NW status monitoring unit 238 has determined that the NW is congested (Yes in S670), NW status monitoring unit 238 further determines whether the congestion level of the NW is no higher than a threshold (S680). NW status monitoring unit 238 determines whether the congestion level of the NW is no higher than the threshold on the basis of at least one of the packet loss rate and the delay time of the NW, for example. NW status monitoring unit 238 may determine that the congestion level of the NW is no higher than the threshold if at least one of the packet loss rate and the delay time is no greater than a threshold, for example.

If NW status monitoring unit 238 has determined that the congestion level of the NW is no higher than the threshold (Yes in S680), controlling unit 235 proceeds to step S690. The processes in steps S690 to S710 are similar to those in steps S380 to S410 illustrated in FIG. 13, and thus descriptions thereof will be omitted.

If NW status monitoring unit 238 has determined that the congestion level of the NW is higher than the threshold (No in S680), controlling unit 235 proceeds to step S720. The process in step S720 is similar to that in step S580 illustrated in FIG. 14, and thus descriptions thereof will be omitted.

As described above, video transmitting device 230a according to the present variation includes first acquiring unit 231 that acquires first video information from imaging unit 210 that captures images of the surroundings of monitored vehicle 200a (an example of a vehicle), risk level map creating unit 234 that creates a risk map indicating a risk region in the surroundings of monitored vehicle 200a, controlling unit 235 (an example of a video creating unit) that creates second video information having a data amount smaller than the data amount of the first video information on the basis of the risk map, communication unit 237 that transmits the second video information to remote monitoring device 130 for remotely monitoring monitored vehicle 200a, and NW status monitoring unit 238 (an example of a determining unit) that determines whether the communication network between monitored vehicle 200a and remote monitoring device 130 is congested.

If NW status monitoring unit 238 has determined that the communication network is congested, NW status monitoring unit 238 further determines whether the congestion level of the communication network is no higher than the threshold. If NW status monitoring unit 238 has determined that the congestion level is no higher than the threshold, communication unit 237 transmits the second video information. If NW status monitoring unit 238 has determined that the congestion level is higher than the threshold, communication unit 237 transmits at least one of the sensing result and the obstruction information.

In the present variation, object detecting unit 233 outputs the obstruction information to risk level map creating unit 234 and controlling unit 235. If NW status monitoring unit 238 has determined that the communication network between monitored vehicle 200a and remote monitoring device 130 is not congested (No in S670), controlling unit 235 creates the second video information (S730) and transmits the second video information to remote monitoring device 130 (S710). To rephrase, communication unit 237 transmits the second video information if NW status monitoring unit 238 has determined that the communication network is not congested. The second video information in this case may be the first video information, for example.

If NW status monitoring unit 238 has determined that the communication network between monitored vehicle 200a and remote monitoring device 130 is congested and that the congestion level of the communication network is no higher than the threshold (Yes in S670 and S680), controlling unit 235 creates the second video information (S700) and transmits the second video information to remote monitoring device 130 (S710). To rephrase, communication unit 237 transmits the second video information if NW status monitoring unit 238 has determined that the congestion level of the communication network is no higher than the threshold. The second video information in this case is video information having a data amount smaller than the data amount of the second video information created when the result is No in step S670.

If NW has determined that the communication network between monitored vehicle 200a and remote monitoring device 130 is congested and that the congestion level of the NW is higher than the threshold (Yes in S670 and No in S680), controlling unit 235 transmits at least one of the sensing result and the obstruction information to remote monitoring device 130 (S720). To rephrase, communication unit 237 transmits at least one of the sensing result and the obstruction information if NW status monitoring unit 238 has determined that the congestion level of the communication network is higher than the threshold. It can be said that if the result is Yes in step S670 and if the result is No in step S680, controlling unit 235 forbids transmission of the video information. Each of the sensing result and the obstruction information has a data amount smaller than the data amount of the second video information created in step S700.

In this manner, controlling unit 235 according to the present variation switches the information to be transmitted in accordance with the congestion level of the NW. Accordingly, video transmitting device 230a can transmit information on the surroundings of monitored vehicle 200a at a more appropriate transmission rate in accordance with the congestion level of the NW.

In step S720, only one of the sensing result and the obstruction information may be transmitted.

Other Embodiments

Thus far, the present disclosure has been described on the basis of Embodiments 1 and 2 (also referred to below as the embodiments), but the present disclosure is not limited to the foregoing embodiments.

For example, in the foregoing embodiments, the controlling unit creates the second video information in accordance with the risk region if the traveling route overlaps the risk region, but this example is not limiting. The controlling unit may create the second video information in accordance with the risk region if the risk level map includes a risk region. This configuration allows the operator to view a clear video corresponding to the risk region in the surroundings of the monitored vehicle while reducing wasted network band.

In the examples described in the foregoing embodiments, of the videos capturing the front, back, right, and left directions, the image quality of the videos capturing the back, right, and left directions (an example of the first region) is degraded to an image quality lower than the image quality of the video capturing the front direction (an example of the second region), this example is not limiting. The second region may be, of the video capturing the front direction, a region corresponding to a risk region within this video, for example. In other words, the second region may be a partial region in the video capturing the front direction. This allows a greater region of the first video information to have a degraded image quality, and thus wasted network band can be further reduced.

In the foregoing embodiments, if the first video information includes video information for a plurality of frames, the controlling unit included in the video transmitting device may create the second video information by extracting one or more frames from the plurality of frames. To rephrase, the controlling unit may reduce the data amount by reducing the number of frames composing a video to be transmitted to the remote monitoring device.

The controlling unit included in the video transmitting device according to the foregoing embodiments may transmit the second video information with the obstruction information incorporated therein to the remote monitoring device. Thus, the remote monitoring device can, for example, change the color of an obstruction within a close range of the monitored vehicle shown in the video displayed on the display device or can allow an obstruction within a close range of the monitored vehicle shown in the video to blink. Accordingly, the video transmitting device can effectively inform the operator of a risk of an obstruction while reducing wasted network band.

The controlling unit included in the video transmitting device according to the foregoing embodiments may transmit the vehicle information of the monitored vehicle to the remote monitoring device via the communication unit. The controlling unit may transmit the vehicle information to the remote monitoring device if a risk region is present in the risk level map or may refrain from transmitting the vehicle information to the remote monitoring device if no risk region is present, for example.

In the examples described in the foregoing embodiments, the imaging unit captures images of the surroundings of the monitored vehicle. The imaging unit may further capture a video of the vehicle interior. If the video transmitting device has received an instruction from the operator instructing the video transmitting device to transmit a video of the vehicle interior, for example, the video transmitting device may transmit third video information that is based on the video of the vehicle interior captured by the imaging unit to the remote monitoring device. In this case as well, the video transmitting device may transmit the third video information having a data amount reduced in accordance with the NW status illustrated in Embodiment 2.

There is no particular limitation on the method of communication between the devices included in the monitored vehicle in the foregoing embodiments. The devices may communicate with each other through wireless communication or wired communication. The devices may also communicate with each other through a combination of wireless communication and wired communication.

The processing units (e.g., controlling unit, risk map creating unit, object detecting unit, NW status monitoring unit, etc.) of the remote monitoring device and the monitored vehicle according to the foregoing embodiments are each typically implemented in the form of large-scale integration (LSI), which is an integrated circuit. These processing units may each be implemented by a single chip, or part or all thereof may be implemented by a single chip.

The circuit integration is not limited to LSI, and an integrated circuit may be implemented by a dedicated circuit or a general-purpose processor. A field-programmable gate array (FPGA) that can be programmed after LSI is manufactured or a reconfigurable processor in which the connection and the setting of the circuit cells within LSI can be reconfigured may also be used.

In the foregoing embodiments, the constituent elements may each be implemented by dedicated hardware or may each be implemented through execution of a software program suitable for a corresponding constituent element. The constituent elements may each be implemented as a program executing unit, such as a central processing unit (CPU) or a processor, reads out a software program recorded in a recording medium, such as a hard disk or a semiconductor memory, and executes the software program.

All the numbers used in the foregoing are for illustrating examples for describing the present disclosure in concrete terms, and the embodiments of the present disclosure are not limited to the illustrated numbers.

The divisions of the functional blocks in the block diagrams are merely examples. A plurality of functional blocks may be implemented as a single functional block, a single functional block may be divided into a plurality of functional blocks, or some of the functions may be transferred to another functional block. Functions of a plurality of functional blocks having similar functions may be processed in parallel or through time sharing by a single piece of hardware or software.

The orders of executing the steps in the flowcharts are for illustrating examples for describing the present disclosure in concrete terms, and the orders may differ from the ones described above. Some of the steps described above may be executed simultaneously (in parallel) with another step.

An embodiment obtained by making various modifications that a person skilled in the art can conceive of to the foregoing embodiments and variations and an embodiment achieved by combining, as desired, the constituent elements and the functions in the embodiments and the variations within the scope that does not depart from the spirit of the present disclosure are also encompassed by the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

An information processing method and so on according to one aspect of the present disclosure is effective in a remote monitoring device for a remotely located operator to remotely monitor a vehicle via a communication network.

What is claimed is:

1. A video transmitting device to be provided in a vehicle, the video transmitting device comprising:
   a first acquiring unit that acquires first video information from an imaging unit that captures images of surroundings of the vehicle;
   a second acquiring unit that acquires a sensing result from a sensor unit that is provided in the vehicle and performs sensing of the surroundings of the vehicle, the sensing result being a result of the sensing during traveling of the vehicle;
   an object detecting unit that creates obstruction information indicating a position and a speed of an obstruction in the surroundings of the vehicle, on a basis of the sensing result and the first video information;
   a risk map creating unit that creates a risk map indicating a risk region in the surroundings of the vehicle, based on the obstruction information;
   a video creating unit that creates second video information having a data amount smaller than a data amount of the first video information, according to whether a risk region is present in a traveling route of the vehicle; and
   a communication unit that transmits the second video information to a remote monitoring device for remotely monitoring the vehicle, wherein
   the obstruction includes a moving body that could obstruct traveling of the vehicle,
   the risk map indicates the risk region in the surroundings of the vehicle at a time when the obstruction information is acquired, the risk region changing dynamically according to the position and the speed of the obstruction, and
   the risk map creating unit creates the risk map by assigning a risk level to the surroundings of the vehicle on a basis of at least one of the first video information and the obstruction information, calculating a dead angle region which the imaging unit and the sensor unit are unable to observe, based on a relationship between the position of the obstruction in the obstruction information and a position of the vehicle, and uniquely assigning a risk level to the dead angle region calculated.

2. The video transmitting device according to claim 1, wherein
   the video creating unit creates the second video information by at least one of degrading, in the first video information, an image quality of a video of a first region corresponding to a region other than the risk region indicated in the risk map to an image quality lower than an image quality of a video of a second region corresponding to the risk region and cutting out the video of the second region from the first video information.

3. The video transmitting device according to claim 1, further comprising:
   a determining unit that determines whether a communication network between the vehicle and the remote monitoring device is congested, wherein
   the communication unit transmits the second video information to the remote monitoring device when the determining unit has determined that the communication network is congested and transmits the first video information to the remote monitoring device when the determining unit has determined that the communication network is not congested.

4. The video transmitting device according to claim 3, wherein
   the communication unit transmits the second video information at a transmission rate lower when the determining unit has determined that the communication network is congested than when the determining unit has determined that the communication network is not congested, and
   the video creating unit creates the second video information from the first video information in accordance with the transmission rate when the determining unit has determined that the communication network is congested.

5. The video transmitting device according to claim 1, wherein
   the remote monitoring device is coupled to an operation input device that receives an operation input for a remote operation of the vehicle, and
   the video creating unit creates the second video information with additional use of a traveling route in the remote operation when the vehicle has received the remote operation through the operation input device.

6. The video transmitting device according to claim 5, wherein
   the video creating unit creates the second video information by at least one of degrading, in the first video information, an image quality of a video of a third region capturing a direction that is not a traveling direction in the traveling route to an image quality lower than an image quality of a video of a fourth region capturing the traveling direction and by cutting out the video of the fourth region from the first video information.

7. The video transmitting device according to claim 1, wherein
the video creating unit creates the second video information with additional use of a target traveling route that the vehicle would travel when the vehicle is traveling through self-driving.

8. The video transmitting device according to claim 1, wherein
the risk map creating unit assigns the risk level to the surroundings of the vehicle on a basis of the first video information and the obstruction information.

9. The video transmitting device according to claim 8, wherein
the risk map creating unit assigns a risk level to the dead angle region calculated which is lower than a risk level assigned to the obstruction.

10. The video transmitting device according to claim 1, further comprising:
a determining unit that determines whether a communication network between the vehicle and the remote monitoring device is congested, wherein
when the determining unit has determined that the communication network is congested, the determining unit further determines whether a congestion level of the communication network is no higher than a threshold, and
the communication unit transmits the second video information when the determining unit has determined that the congestion level is no higher than the threshold and transmits at least one of the sensing result and the obstruction information when the determining unit has determined that the congestion level is higher than the threshold.

11. The video transmitting device according to claim 1, wherein
the risk map creating unit creates the risk map from traffic information of the surroundings of the vehicle.

12. The video transmitting device according to claim 1, wherein
the video creating unit creates the second video information by uniformly degrading the image quality of the first video indicated by the first video information when the risk region is not present in the risk map.

13. The video transmitting device according to claim 1, wherein
the video creating unit refrains from creating the second video information when the risk region is not present in the risk map.

14. The video transmitting device according to claim 1, wherein
the risk map creating unit creates the risk map based on a dynamic risk map created based on the obstruction information and a static risk map created based on traffic information.

15. The video transmitting device according to claim 1, wherein
the risk map creating unit creates the risk map based on the position of the obstruction and a distance that the obstruction moves in a predetermined period.

16. A video transmitting device to be provided in a vehicle, the video transmitting device comprising:
a first acquiring unit that acquires first video information from an imaging unit that captures images of surroundings of the vehicle;
a second acquiring unit that acquires a sensing result from a sensor unit that is provided in the vehicle and performs sensing of the surroundings of the vehicle, the sensing result being a result of the sensing during traveling of the vehicle;
an object detecting unit that creates obstruction information indicating a position and a speed of an obstruction in the surroundings of the vehicle, on a basis of the sensing result and the first video information;
a risk map creating unit that creates a risk map indicating a risk region in the surroundings of the vehicle, based on the obstruction information;
a video creating unit that creates second video information, according to whether a risk region is present in a traveling route of the vehicle;
a communication unit that transmits monitoring information to be transmitted to a remote monitoring device for remotely monitoring the vehicle; and
a determining unit that determines whether a communication network between the vehicle and the remote monitoring device is congested, wherein
the communication unit transmits the monitoring information including at least one of the sensing result, the obstruction information, and the second video information selected on a basis of a determination result of the determining unit,
the obstruction includes a moving body that could obstruct traveling of the vehicle,
the risk map indicates the risk region in the surroundings of the vehicle at a time when the obstruction information is acquired, the risk region changing dynamically according to the position and the speed of the obstruction, and
the risk map creating unit creates the risk map by assigning a risk level to the surroundings of the vehicle on a basis of at least one of the first video information and the obstruction information, calculating a dead angle region which the imaging unit and the sensor unit are unable to observe, based on a relationship between the position of the obstruction in the obstruction information and a position of the vehicle, and uniquely assigning a risk level to the dead angle region calculated.

17. The video transmitting device according to claim 16, wherein
the communication unit transmits at least one of the sensing result and the obstruction information to the remote monitoring device when the determining unit has determined that the communication network is congested and transmits the second video information to the remote monitoring device when the determining unit has determined that the communication network is not congested.

18. A video transmitting method for a video transmitting device to be provided in a vehicle, the video transmitting method comprising:
acquiring first video information from an imaging unit that captures images of surroundings of the vehicle;
acquiring a sensing result from a sensor unit that is provided in the vehicle and performs sensing of the surroundings of the vehicle, the sensing result being a result of the sensing during traveling of the vehicle;
creating obstruction information indicating a position and a speed of an obstruction in the surroundings of the vehicle, on a basis of the sensing result and the first video information;
creating a risk map indicating a risk region in the surroundings of the vehicle, based on the obstruction information;

creating second video information having a reduced data amount from the first video information, according to whether a risk region is present in a traveling route of the vehicle; and transmitting the second video information to a remote monitoring device for remotely monitoring the vehicle, wherein the obstruction includes a moving body that could obstruct traveling of the vehicle, the risk map indicates the risk region in the surroundings of the vehicle at a time when the obstruction information is acquired, the risk region changing dynamically according to the position and the speed of the obstruction, and the creating of the risk map includes creating the risk map by assigning a risk level to the surroundings of the vehicle on a basis of at least one of the first video information and the obstruction information, calculating a dead angle region which the imaging unit and the sensor unit are unable to observe, based on a relationship between the position of the obstruction in the obstruction information and a position of the vehicle, and uniquely assigning a risk level to the dead angle region calculated.

19. A non-transitory computer-readable recording medium for use in a computer, the recording medium having a computer program recorded thereon for causing the computer to execute the video transmitting method according to claim 18.

* * * * *